W. A. CHRYST.
CASH REGISTER.
APPLICATION FILED JUNE 7, 1913.

1,230,864.

Patented June 26, 1917.
13 SHEETS—SHEET 2.

Witnesses
C. Klostermann
J. B. Ricketts

Inventor
William A. Chryst
by
Chester H. Braselton
Attorneys

W. A. CHRYST.
CASH REGISTER.
APPLICATION FILED JUNE 7, 1913.
1,230,864.
Patented June 26, 1917.
13 SHEETS—SHEET 3.
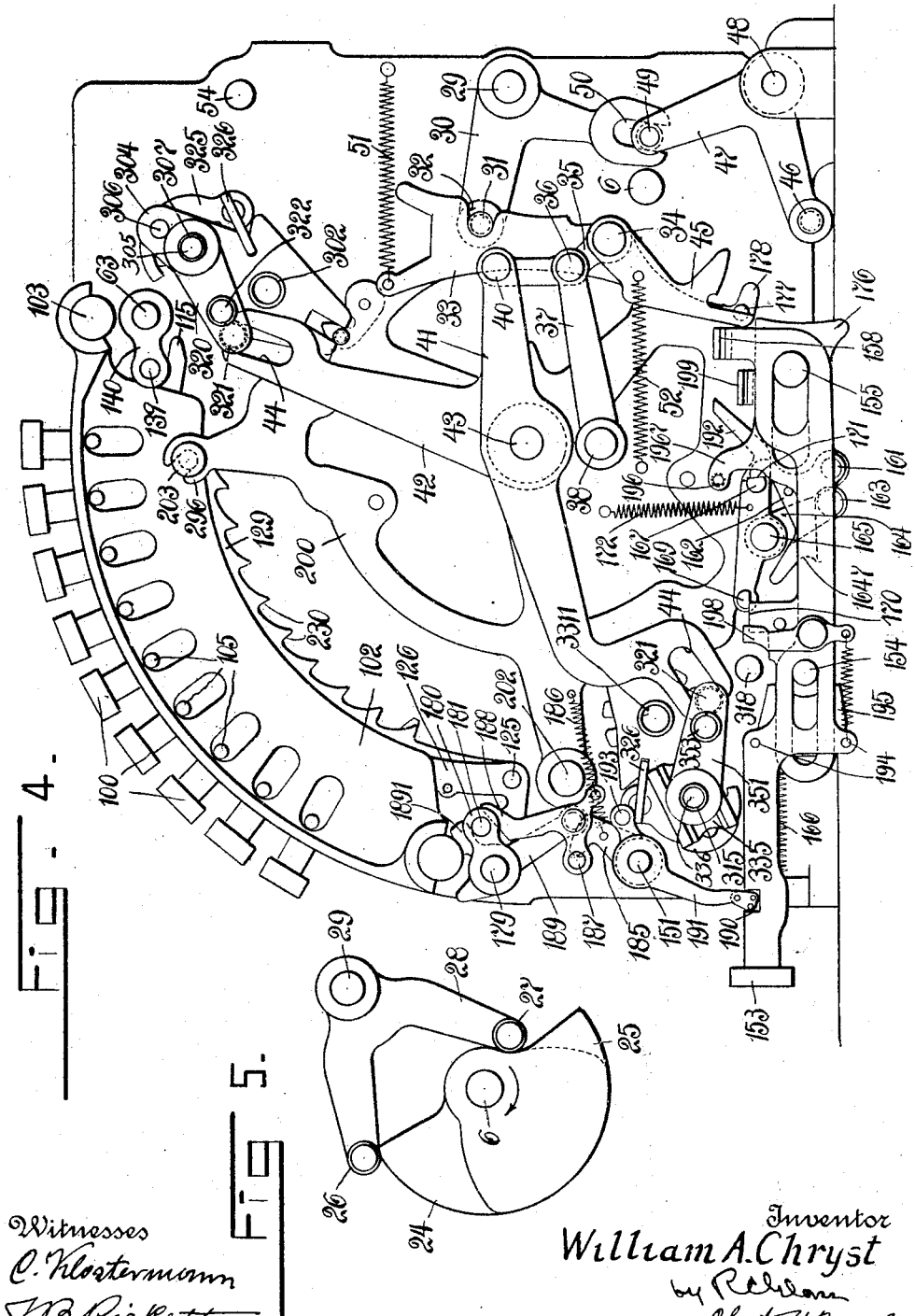
Witnesses
C. Klostermann
J. B. Ricketts
Inventor
William A. Chryst
by R. Allen
Chester H. Braselton
Attorneys

W. A. CHRYST.
CASH REGISTER.
APPLICATION FILED JUNE 7, 1913.

1,230,864.

Patented June 26, 1917.
13 SHEETS—SHEET 5.

Witnesses
C. Klostermann
J. B. Ricketts

Inventor
William A Chryst
by Chester H Braselton
Attorneys

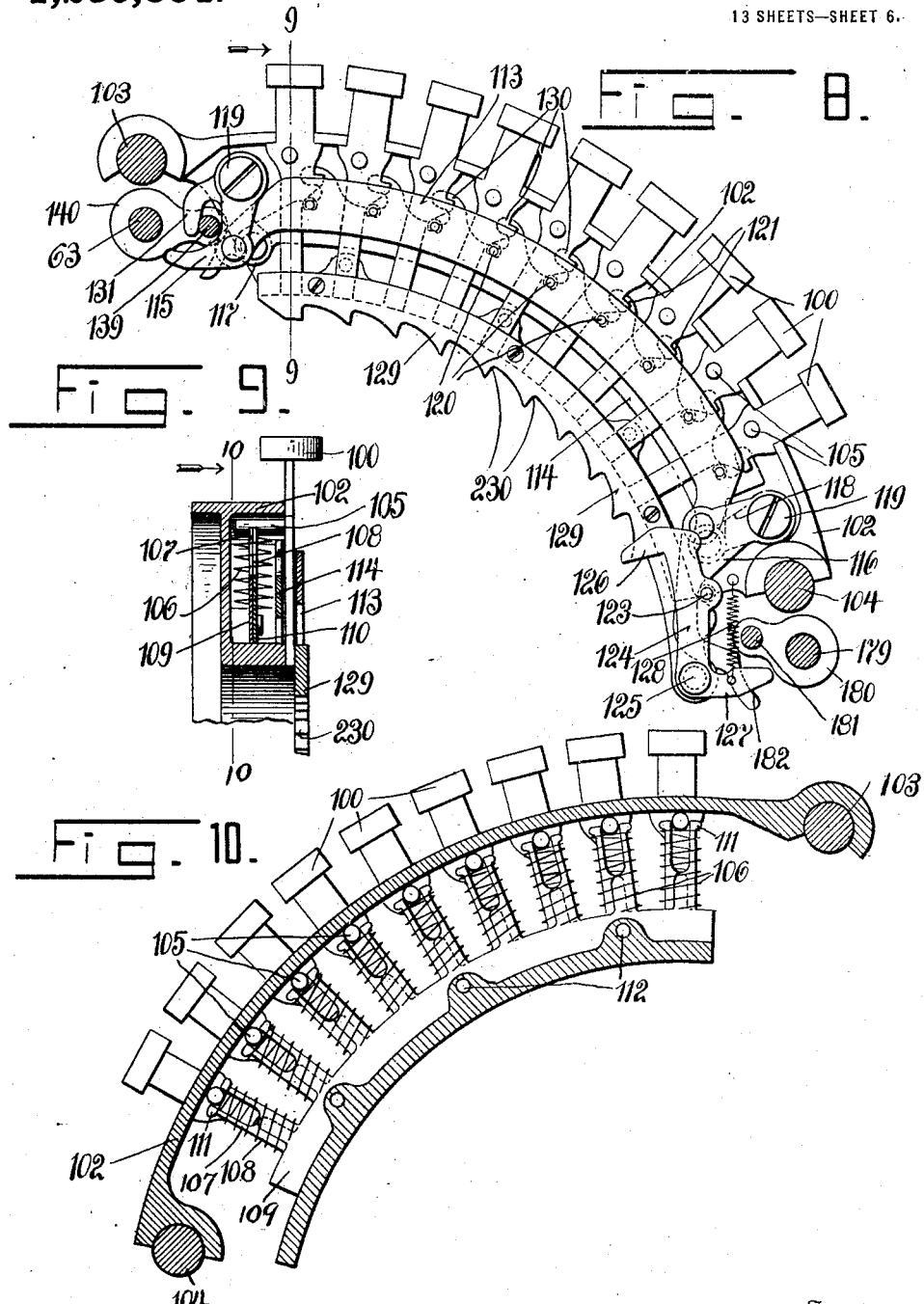

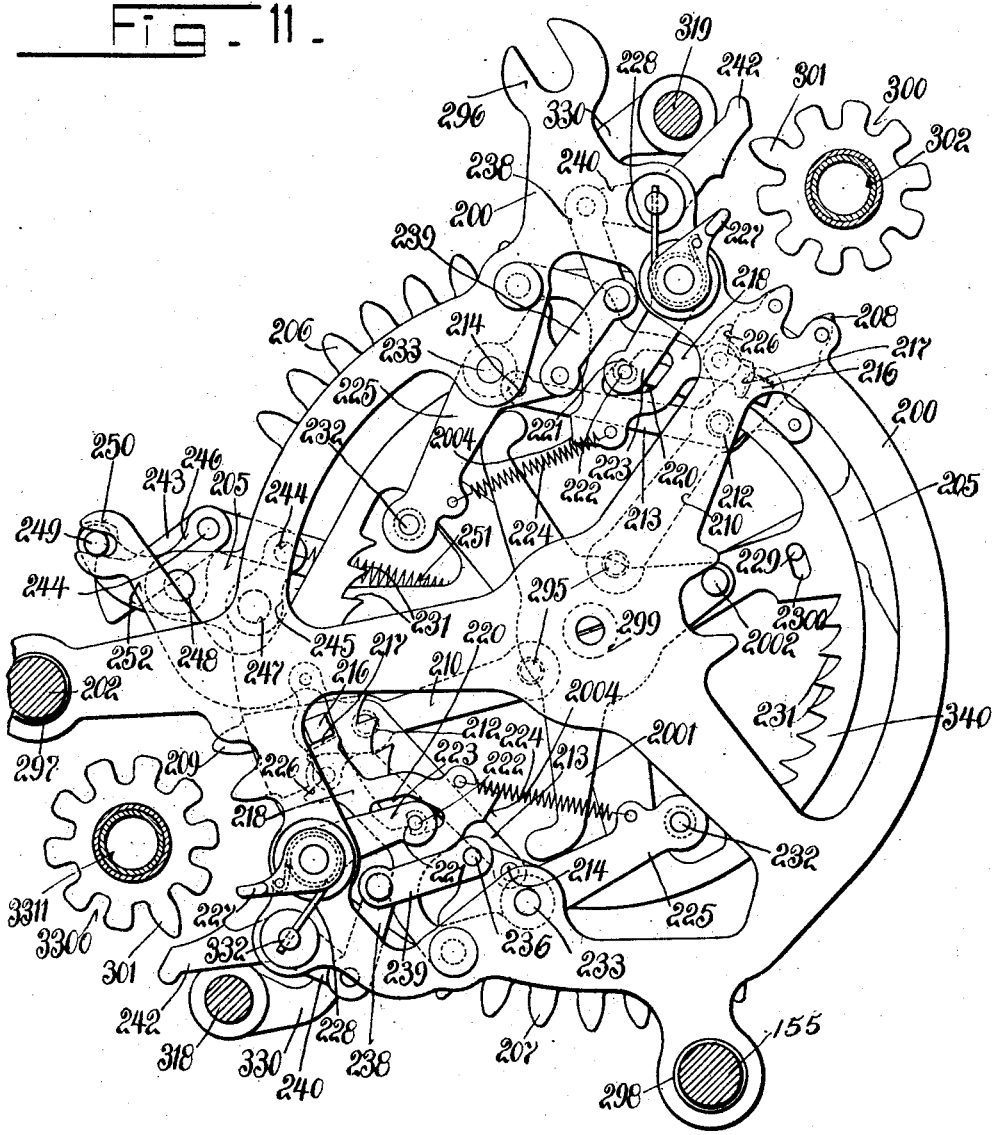

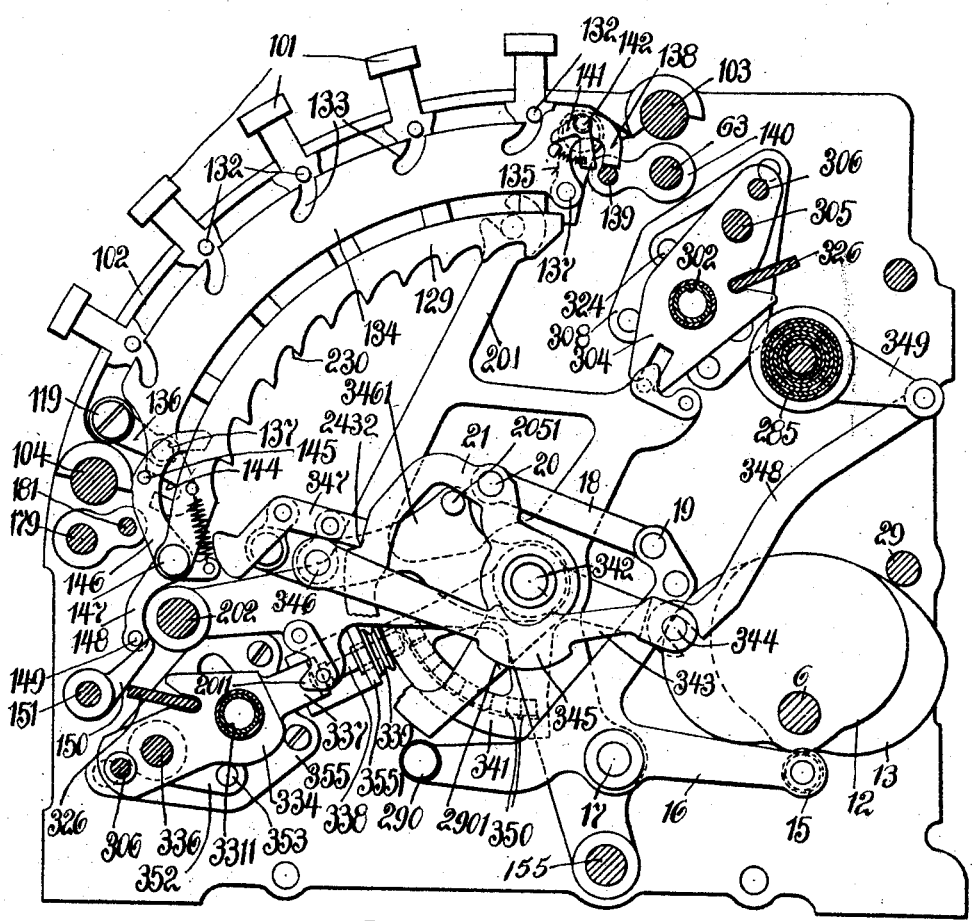
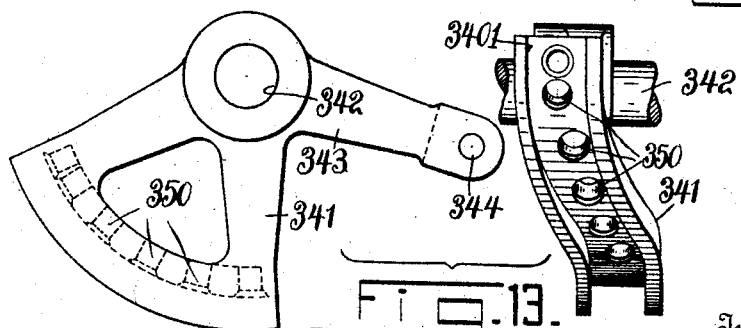

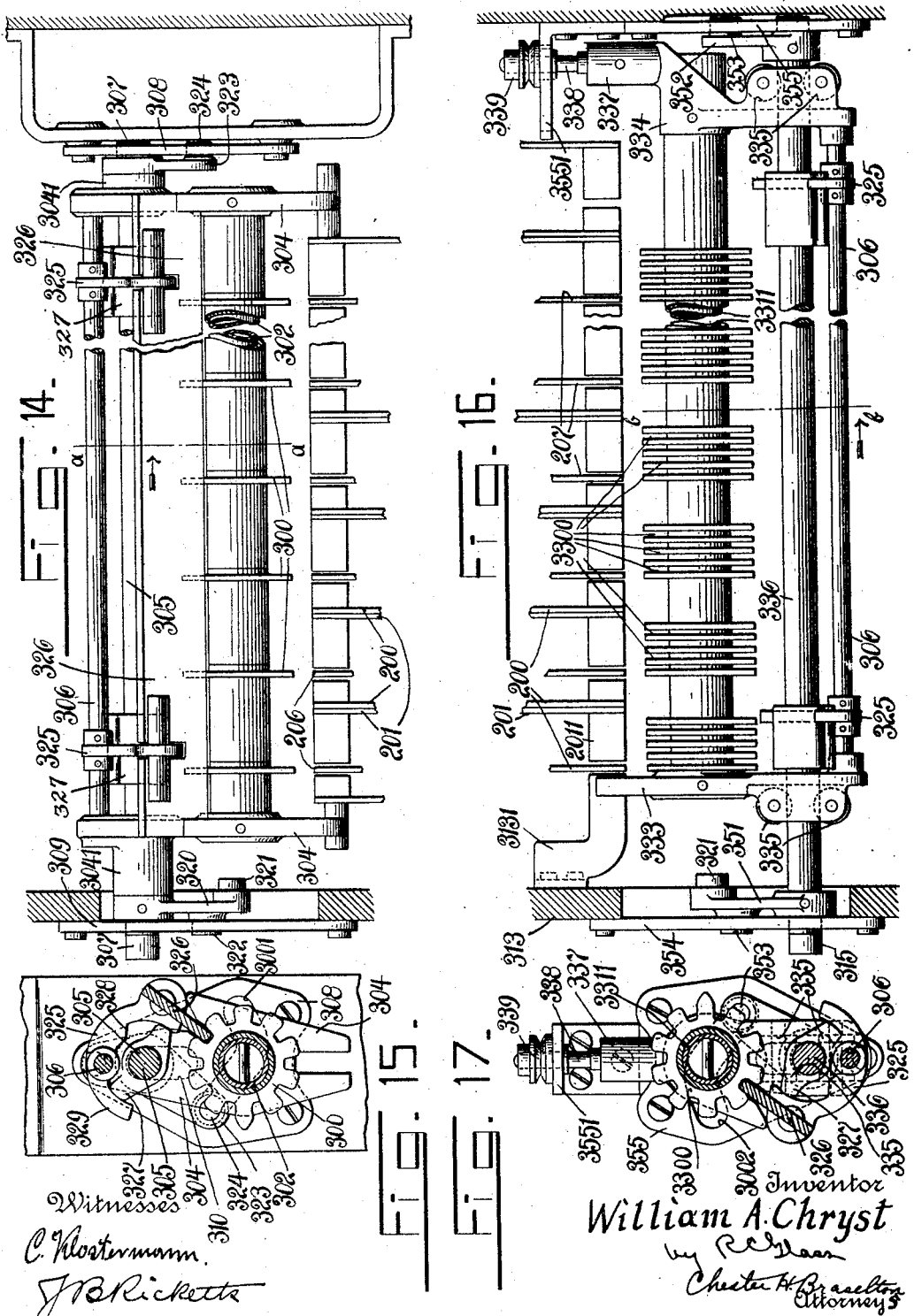

W. A. CHRYST.
CASH REGISTER.
APPLICATION FILED JUNE 7, 1913.

1,230,864.

Patented June 26, 1917.
13 SHEETS—SHEET 10.

Witnesses
C. Klostermann
J. B. Ricketts

Inventor
William A Chryst
by R. Chlean
Chester H Braucher
Attorneys

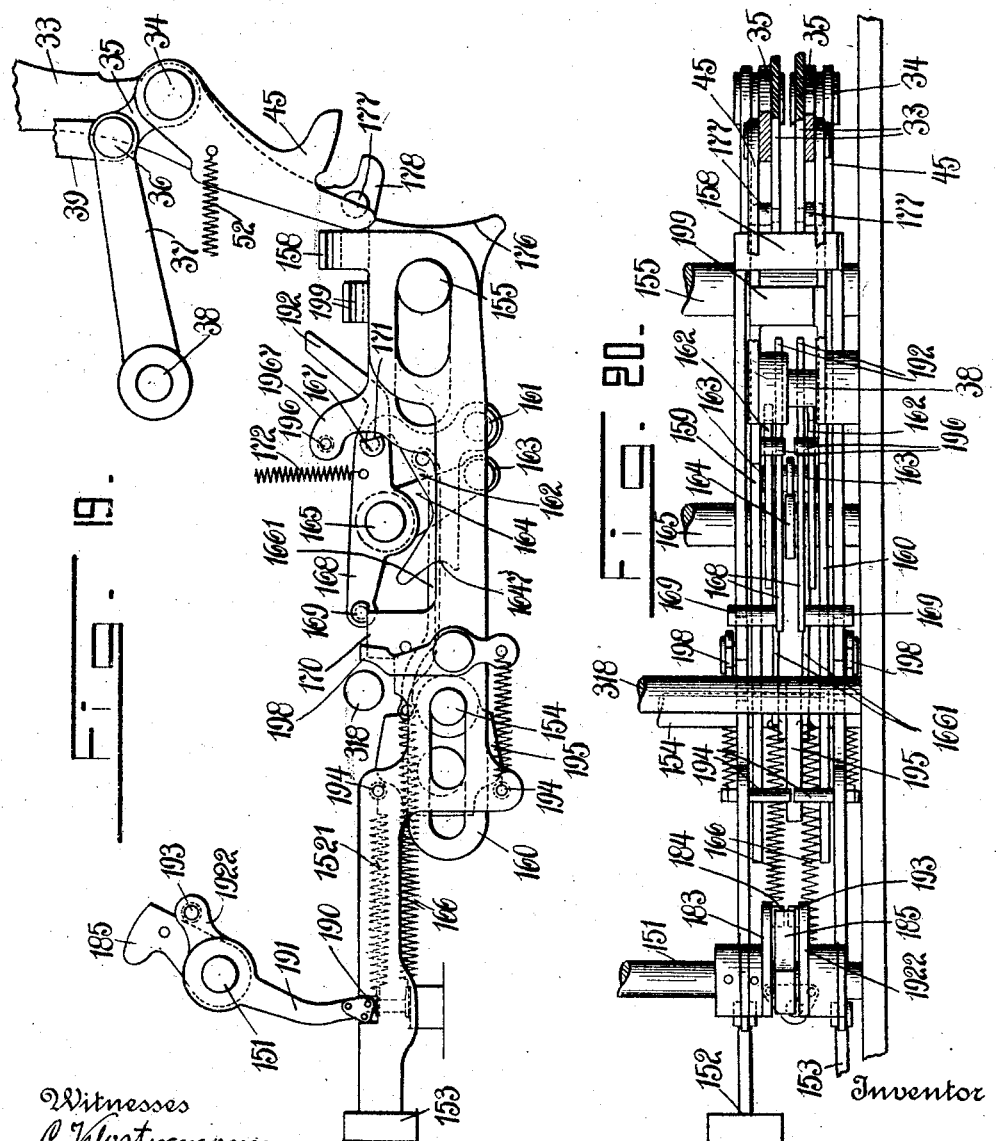

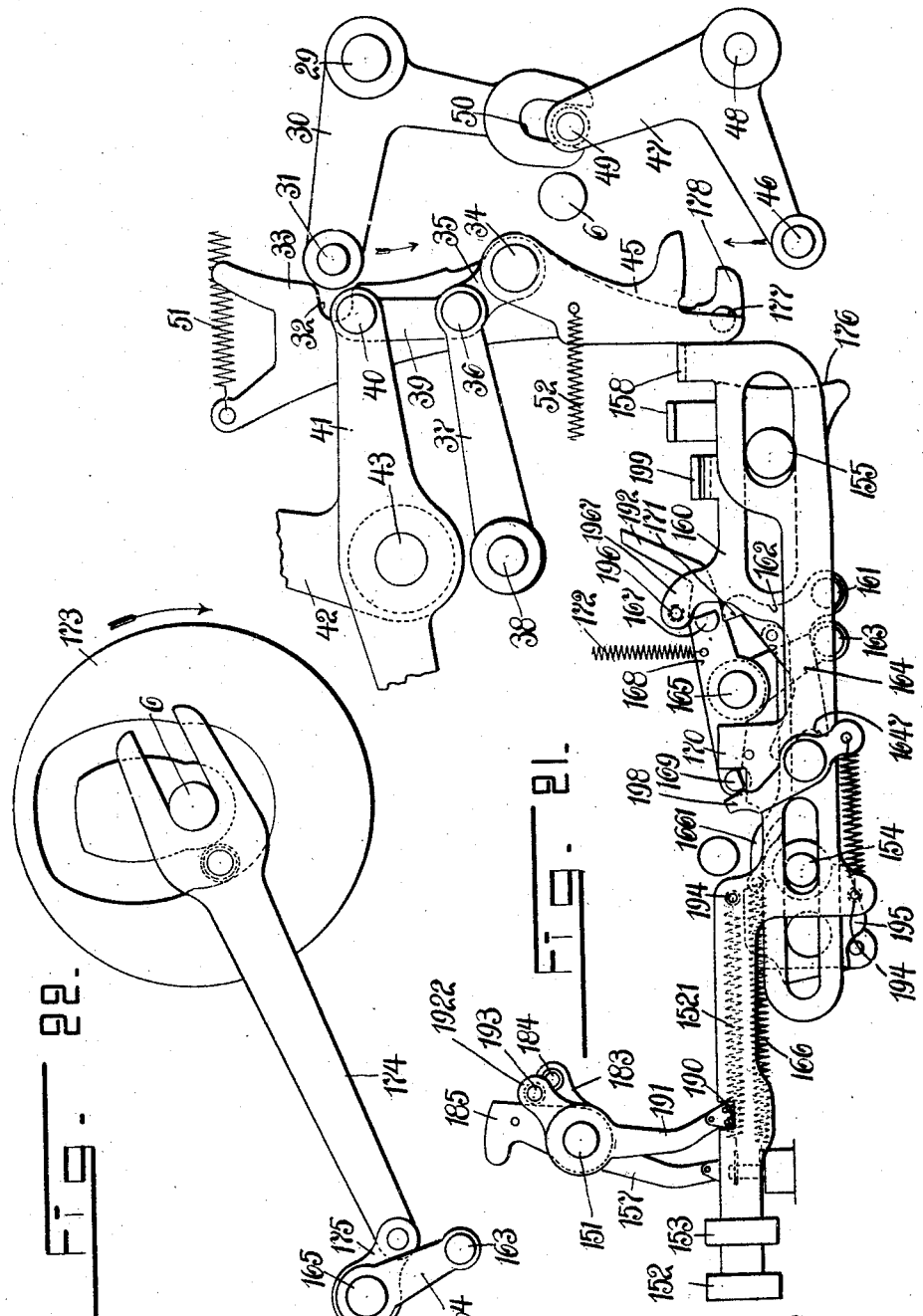

W. A. CHRYST.
CASH REGISTER.
APPLICATION FILED JUNE 7, 1913.
1,230,864.
Patented June 26, 1917.
13 SHEETS—SHEET 13.
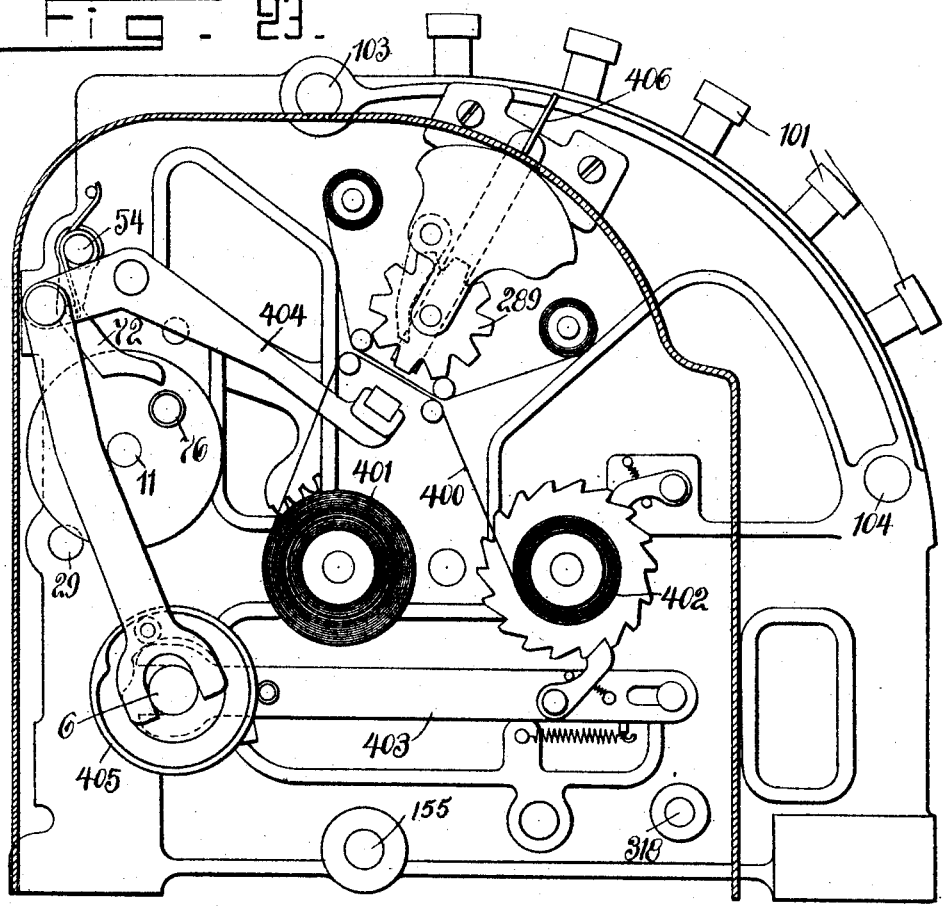
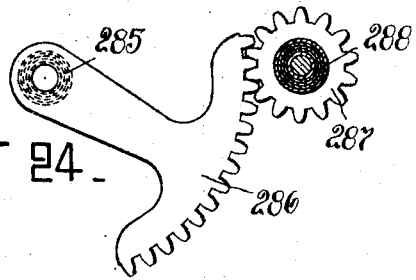
Witnesses
C. Klostermann
J. B. Ricketts
Inventor
William A Chryst
by R. Elslom
Chester H Braselton
Attorneys

UNITED STATES PATENT OFFICE.

WILLIAM A. CHRYST, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,230,864.      Specification of Letters Patent.      Patented June 26, 1917.

Application filed June 7, 1913. Serial No. 772,276.

*To all whom it may concern:*

Be it known that I, WILLIAM A. CHRYST, a citizen of the United States, residing at Dayton, in the county of Montgomery and State of Ohio, have invented certain new and useful Improvements in Cash-Registers, of which I declare the following to be a full, clear, and exact description.

This invention relates to cash registers and in particular to the class of registers known as multiple totalizer registers and more particularly relates to those known as department registers, wherein it is desirable mechanically to totalize entries according to their class, and also to accumulate the grand total, and to print entries and totals on a record strip or sales slips.

The objects of the invention are to provide improved constructions for operating accounting devices, effecting carrying operations, alining totalizers, and the printing of totals and subtotals. The improvements include actuators for the accounting devices which are movable differentially and carry a plurality of racks, part at least, of each rack being movable relative to the supporting part of the actuator, thus providing means for operating totalizing devices simultaneously but effecting in them independent transfer operations. The relative movement between parts of the actuators is also employed to permit overthrow of the main part of the actuators due to their elasticity and inertia, while the parts which are in engagement with the accounting devices may remain stationary. Improvements in carrying mechanism are provided in that relative movement between an actuating rack and its differentially movable support is positively effected while normally the rack and its support are locked together positively. The totalizer supporting frames carry alining devices which serve to aline and lock the totalizer pinions when the totalizers are out of engagement and when they are being shifted with respect to their actuators, but are so constructed that an engaging movement of the totalizers serves to effect unlocking movement of the alining devices.

It is also a feature of the invention so to mount the actuators with respect to their driving elements that in an operation of the machine all the actuators and the parts they drive will not be started in their movement simultaneously but successively and with corresponding successive completion of their movements thus to eliminate otherwise sudden substantial increases and decreases of load upon the operating mechanism at various times in the operation of the machine, and effect a much smoother operation of the machine as a whole. This arrangement of the actuators also is of utility in properly providing for transfers in this particular positive transfer mechanism in which transfers should be successive from between lower to between higher totalizer pinions.

In combination with differential mechanism driven by invariable movable members through latch connections, the invention includes totalizer controlled latch operating mechanism to control the differential mechanism on total printing operations.

Improved devices are provided for effecting two continuous operations of the machine on total and subtotal printing operations as in printing totals or sub-totals it is necessary to give the machine a preliminary operation for the purpose of selecting a totalizer and to restore mechanism displaced during a preceding entry.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:

Fig. 4 is a right side elevation of the machine with the right side frame and mechanism shown in Fig. 2 removed.

Fig. 5 is a detail of totalizer engaging cams.

Figures 7, 7A:
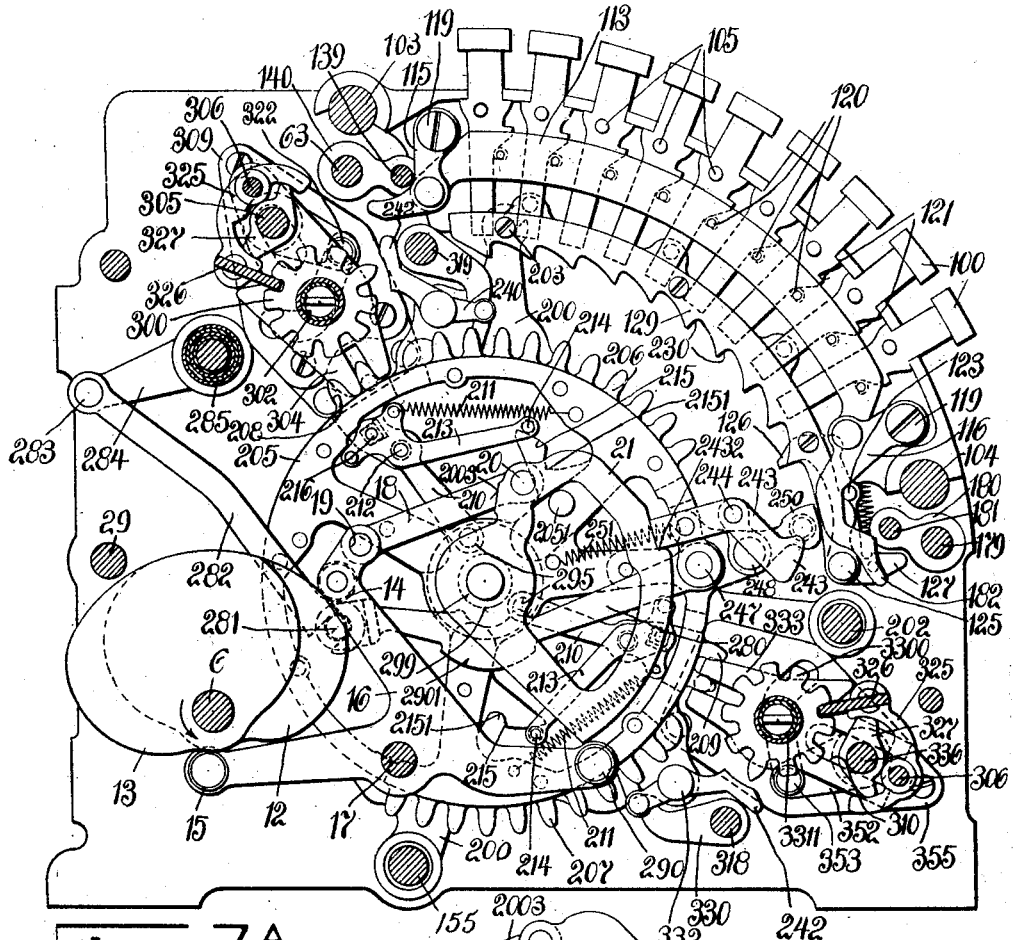
Fig. 7 is another transverse vertical section viewed from the opposite direction and showing various details of construction not included in Fig. 6.

Fig. 7ᵃ is an illustrative view showing the special arrangement of the cams for driving the actuators successively.

Fig. 8 is a view in left side elevation of one bank of value keys showing in section the supporting shafts.

Fig. 9 shows a vertical section taken on the line 9—9 of Fig. 8.

Fig. 10 is a detail section taken on the line 10—10 of Fig. 9.

Fig. 11 is a detail in right side elevation of one section of the differential mechanism and its supporting frames.

Fig. 12 is a transverse vertical section taken at the right of the bank of department keys and looking to the left.

Fig. 13 comprises two detail views of a spiral cam employed to select for operation the department totalizers.

Fig. 14 is a rear view of the totalizer in which grand totals are accumulated.

Fig. 15 is a section taken on the line $a-a$, Fig. 14, looking in the direction of the arrow.

Fig. 16 is a bottom plan of department totalizers.

Fig. 17 is a sectional view on the line $b-b$, Fig. 16, looking in the direction of the arrow.

Figure 18:
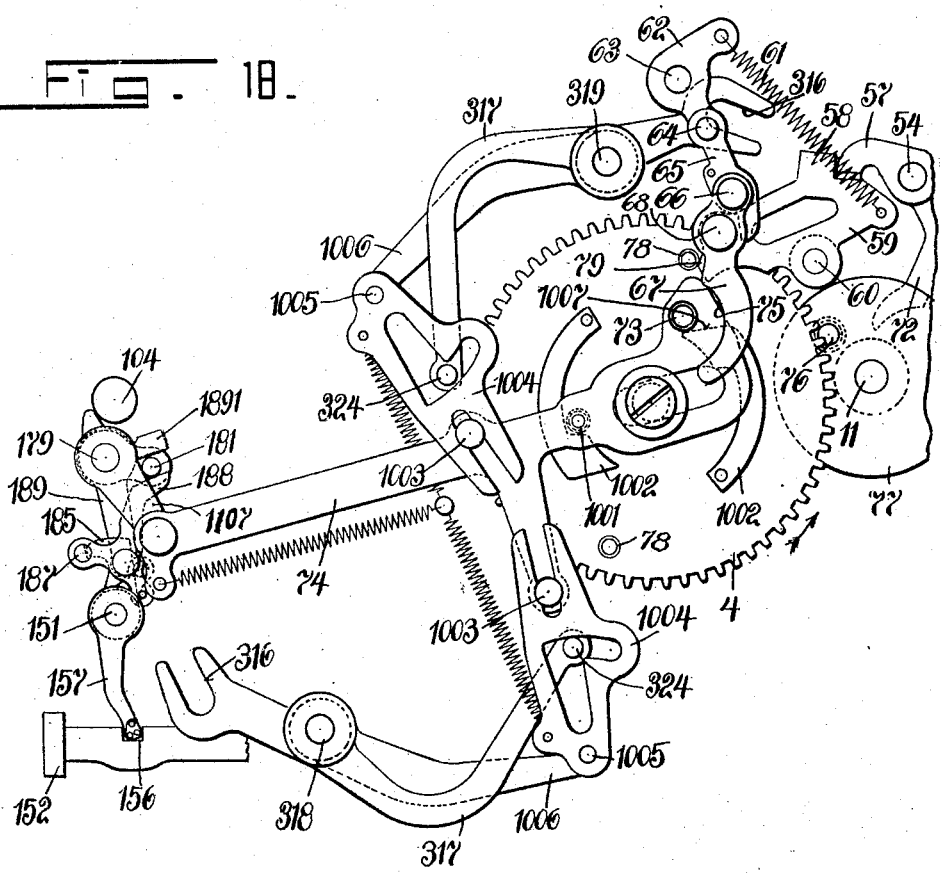

Fig. 18 is a detail in right side elevation of controlling mechanism employed mainly in total printing operations.

Fig. 19 shows in right side elevation keys and related mechanism employed in taking impressions of totals.

Fig. 20 is a plan view of the mechanism shown in Fig. 19.

Fig. 21 is a detail similar to Fig. 19 but showing mechanism as it would appear with the department total key depressed.

Fig. 22 is a detail of mechanism for operating slides shown in Fig. 21.

Fig. 23 is a view in left side elevation just within the end casing showing the printing mechanism at the left of the machine.

Fig. 24 is a detail of type setting mechanism.

The machine includes various mechanisms, namely, a driving mechanism, keyboard, differential mechanism, one grand totalizer and a plurality of department totalizers, printing mechanism here shown for printing items on a detail strip but which may be employed equally as well for printing on inserted slips, and, finally, devices employed in the printing of totals.

The driving mechanism comprises mainly two main drive shafts with gear connections whereby these shafts may be caused to make one rotation by two rotations of a crank. The single rotation of the drive shafts is all that is required when items are added in the machine, but the driving mechanism may be controlled by total keys so that the drive shafts make two complete rotations before the machine is finally stopped and locked in its zero position: This is for the purpose of causing the driving mechanism to restore all mechanism to its home position before a total printing operation occurs, and to select the proper department totalizer in time for it to be operated properly in total taking operations.

The keyboard comprises a plurality of banks of amount keys, one bank of department keys and two total keys, one of which is used for the printing of totals and subtotals from the main or grand totalizer and the other is employed for the printing of totals and sub-totals from the department totalizers.

The differential mechanism comprises a plurality of differentially movable segments on which are mounted two sets of racks, one for operating the grand totalizing device and the other for operating the department totalizers. Each segment of the differential mechanism carries a latch by which it is normally connected to oscillating members having a constant movement and connected to the driving mechanism. The latches are constructed to disengage the segments from the oscillating members when carried into engagement with the shanks of depressed keys. In this manner differential movement is imparted positively to the differential segments, the racks or actuators which are mounted on these segments being in position to coöperate with totalizer pinions which are engaged therewith on the forward or return strokes of the actuators. The actuating racks are each made in two parts and one part may be moved relatively to the other so that transfers may be effected or not as desired and this relative movement in the present case is not accomplished through the action of springs but is positively effected. As stated above the actuating racks are designed to start and complete their movements successively to eliminate sudden jars in the operation of the machine.

Two frames are provided for supporting the totalizing devices. One of the frames supports the main or grand totalizing device and the other frame supports a plurality of department totalizers. The department totalizer frame is shiftable transversely of the plane of the actuators so that any totalizing device may be brought into operative relation therewith, and both supporting frames are shiftable toward and away from the actuators for the purpose of engaging and disengageing the totalizers. The engaging movement of the totalizers occurs through connections to the driving mechanism which connections operate in a regular way except when totals are printed. The transverse shifting of the department totalizer carrying frame is accomplished through connections to the driving mechanism which connections are controlled by the bank of department keys.

The printing mechanism comprises a plurality of type carriers operatively connected with the differential mechanism so as to be set differentially according to the movement of the differential mechanism whether controlled by the keyboard when items are entered or by the totalizers when totals are printed. An ink ribbon, paper strip and platen, all operating in well known manners, are as usual included.

Driving mechanism.

Figure 2:
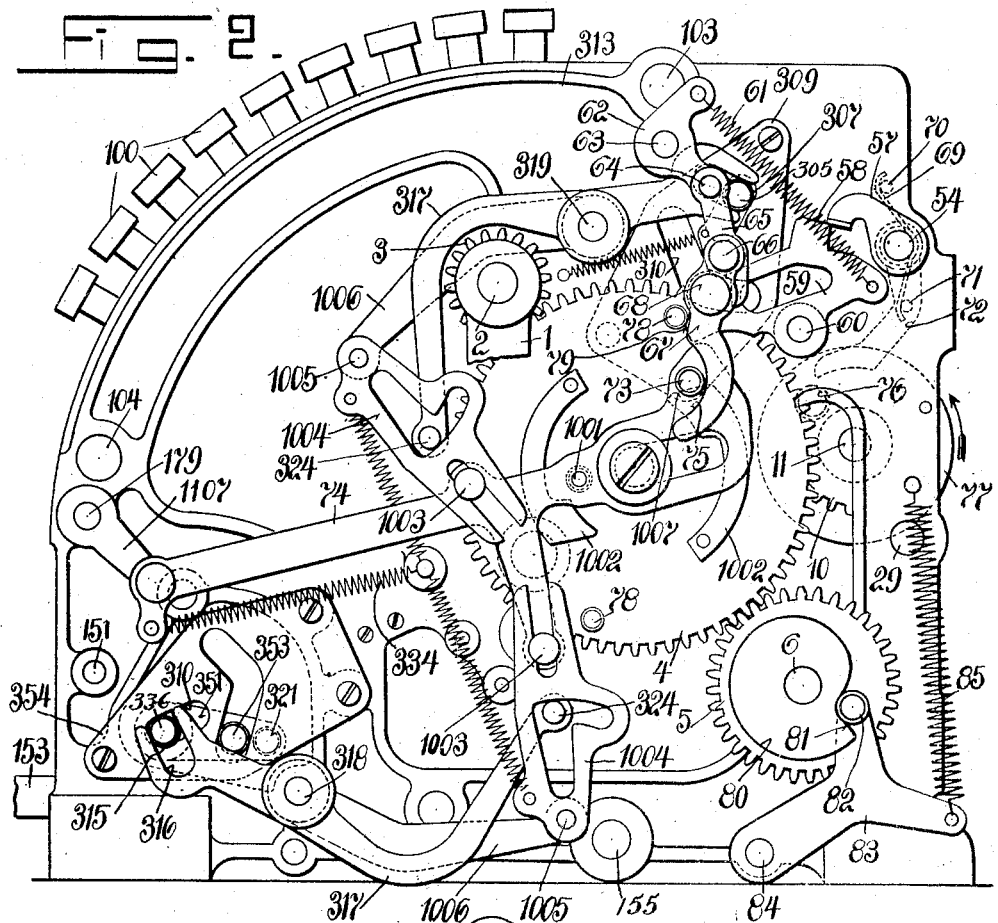
Fig. 2 is a right side elevation with the casing omitted of a machine constructed according to the invention.
Figure 3:
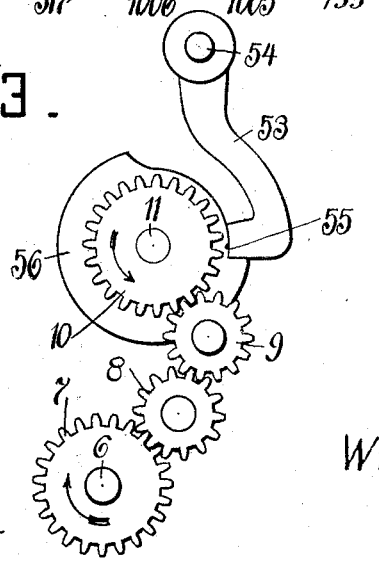
Fig. 3 is a detail of gear connections between drive shafts and a machine lock.

Referring to the drawings, Figs. 2 and 3 show how rotation may be imparted to the main drive shafts 6 and 11. A manually operative crank 1 (shown partly broken away) is journaled on a stub shaft 2 and is fast to a pinion 3 meshing with a large gear 4 also journaled on a stub shaft and meshing with gear 5 fast to drive shaft 6. The drive shaft 6 (Fig. 3) also carries a gear 7 connected through intermediate pinions 8 and 9 to a gear 10 fast to drive shaft 11. By means of this gearing two clockwise rotations of crank 1 serve to cause a single rotation of shafts 6 and 11 in the directions indicated by the arrows in Fig. 3.

It is, of course, to be understood that any other means or source of power may be employed without departing from the spirit of the present invention. The crank means shown is only for the purpose of illustration.

To drive the differential mechanism, shaft 6 is provided with a plurality of pairs of cams 12 and 13 (Figs. 7 and 7$^a$) each pair of which coöperates with rollers 14 and 15 journaled on pins in Y-shaped bell crank levers 16 of which there is one for each bank of keys and which are journaled on stub pins 17 one of which is carried by the frame for each differential unit as will be hereinafter made clear. The bell crank levers 16 at their upper ends are connected by pivots 19 to links 18, the latter at their forward ends being pivoted by pins 20 to segments 21 loose on individual sleeves 299 connecting supporting frames 200 and 201 (Figs. 4, 6, 7, 11, and 12) for the differential segments to be described farther on. Segments 21 are by this mechanism oscillated invariable extents on operations of the machine and serve to drive differential mechanism under the control of the value keys and also differential mechanism under the control of a bank of department keys. The differential mechanism as a whole has connections for selecting department totalizers for operation and for driving these totalizers and the main totalizer differentially and also for setting type carriers in the printing mechanism.

The pairs of cams 12 and 13 are arranged spirally on the shaft 6. That is, the units cams are set slightly ahead of the tens cams, the tens cams slightly ahead of the hundreds cams and so on along the shaft. In Fig. 7$^a$ this arrangement of the cams is shown, but is purposely exaggerated a little to make the idea clear. In actual practice one pair of cams is set approximately $6\frac{1}{2}$ degrees ahead of the pair of cams of next highest order. One purpose of this arrangement of the cams is to make possible a positive transfer from one totalizer wheel to the wheel of next higher order. This positive transfer mechanism will be fully described later. Another purpose of this arrangement of the cams is to make the machine easier in its operation. Each pair of cams drives a division of the machine and by staggering the cams no two of the pairs of cams will start or stop their sections of the mechanism simultaneously and the functions of each section will be performed in corresponding relation to the functions being performed by the other sections. This has the effect of distributing the movement of the mechanism along the stroke of the operating handle, lessening the resistance to the movement of the handle that is found in similar devices where the sections operated are started and stopped at the same instant and perform simultaneously their functions such as adding and setting the type carriers. So far as the transfer from one totalizer wheel to another is concerned, the units actuator cams need not necessarily be placed ahead of the tens actuator cams, but such is preferable to promote smoother operation of the mechanism, it being obvious that by arranging the pairs of cams spirally on the driving shaft the differential members will be picked up singly and released singly thereby eliminating the jar which would be present in this machine and is in fact present in other machines where the condition prevails that all of the registering segments are picked up simultaneously.

Figs. 4 and 5 show connections whereby the driving mechanism imparts power to devices for engaging the totalizers with their actuating racks. For this purpose drive shaft 6 carries a pair of cams 24 and 25 (Fig. 5) which operate on rollers 26 and 27 carried by a bell crank lever 28 fast to shaft 29. Also fast to shaft 29 is a bell crank lever 30 the downwardly extending arm of which is provided with a slot 50 into which extends a roller 49 on a bell crank lever 47 pivoted on stud 48. Thus oscillation of bell crank lever 30 effects an opposite oscillation of bell crank lever 47. The lever 30 has a roller 31 at the forward end of its horizontal arm, while the bell crank lever 47 has a correspondingly located roller 46. The roller 31 projects into a pair of slots 32 each formed in one of a pair of plates 33 in lateral alinement. Each of the plates 33 is formed with a foot or projection 178 at its lower end for a purpose hereinafter described, and each plate is pivoted independently by a pin 34 to its appropriate one of a pair of links 35. Each of the links 35 is pivoted at 36 to one of a pair of arms 37 pivoted on a stud 38 extending from the right hand side frame of the machine. At their upper extremities the links 35 are pivoted at 40 to two levers 41 and 42 loosely journaled on a stud 43 also extending from the right hand side frame. The right hand or forward link 35 in Fig. 4 is connected in the above manner to the lever 41 and the right hand or forward plate 33 in Fig. 4. The left hand link 35, concealed by being behind the one shown in Fig. 4, is connected to the lever 42 and the left hand plate 33 concealed in Fig. 4. The location of the left and right hand parts above mentioned are clearly indicated in Fig. 20. It will be understood that each of the levers 41 and 42 is in the above manner independently connected to one of the pair of plates 33. The levers 41 and 42 have slots 44 for engaging rollers 321 on arms 320 and 351 fast to totalizer engaging shafts 305 and 336 (Figs. 14 to 17), the particular arrangement of which will be pointed out farther on, it now being intended merely to show how power is transmitted to the totalizer engaging mechanism. From the above construction, it will be seen that oscillation of bell crank lever 30 normally will cause, at a definite time in the operation of the machine determined by the contour of cams 25 and 24 (Fig. 5), a reciprocation of both of the plates 33, and consequently levers 41 and 42 will be rocked, thereby rocking the shafts 305 and 336, and in this manner cause the engagement of the totalizers with their actuating mechanism as required for performing additions in the totalizers.

The object of bell crank lever 47 is to operate the totalizer engaging mechanism when totals or subtotals are printed while the lever 30 directly operates this mechanism in item entering operations. Total keys are provided by which the plates 33 may be disengaged from bell crank lever 30 and positioned for engagement with bell crank lever 47 but these keys and their connecting mechanism will be described farther on. Springs 51 normally hold the plates 33 in engagement with roller 31 on the bell crank lever 30. To the pivot 34 which supports each plate 33 is also pivoted a pawl like member 45 normally held out of operative relation with roller 46 on bell crank lever 47, as shown in Fig. 4, by a spring 52. The total keys have connections for rocking the plates 33 and pawls 45 against the action of these springs and accordingly reversing the connections with bell crank levers 30 and 47 for the purpose of changing the time of engagement of the totalizers with their actuating racks.

The driving mechanism of the machine is normally locked by a pawl 53 (Fig. 3) fast to a shaft 54 and held in a notch 55 formed in a disk 56. The disk 56 is fast to drive shaft 11 and, consequently, operation of the driving mechanism is normally prevented. A spring 69 (Fig. 2) coiled upon shaft 54 and bearing between a pin 70 on a machine frame and a pin 71 on an arm 72 fast to shaft 54 normally urges the shaft to rock in a counter-clockwise direction and thereby disengage pawl 53 from notch 55 but a pawl 57 also fast on shaft 54 has a lateral extending flange normally resting on a shoulder 58 of a plate 59 pivoted by a pin 60 to the machine frame (Figs. 2 and 18). Thus in order to release the machine it is necessary to rock plate 59 counter-clockwise around pivot 60 in order to permit downward rocking of pawl 57, thus permitting spring 69 to withdraw pawl 53 from notch 55.

To so rock plate 59 the bank of department keys to be described farther on, controls means for permitting operation of a spring 61 extended between plate 59 and a bell crank lever 62 fast to a shaft 63. The bell crank lever 62 is pivotally connected by a pin 64 to a link 65 pivoted near its lower end by a pin 66 to a lever 67 pivoted by a pin 68 to plate 59. A roller 73 carried by a pitman 74, is normally in poistion to be engaged by a forward curved egde 75 of lever 67. By this mechanism when a rocking movement of shaft 63 is permitted in a manner hereinafter described by the depression of a department key, spring 61 rocks the bell crank lever 62 in a clockwise direction causing the pin 64 to move downwardly slightly, thus pushing downward on link 65 and through lever 67 causing plate 59 to rock in a counter-clockwise direction, rocking movement of lever 67 being at this time prevented by roller 73. In this manner pawl 57, shaft 54, and locking pawl 53 are permitted to rock counter-clockwise and release the machine.

At an end of the operation of the machine pawl 53 is caused to reëngage the notch in disk 56 by a roller 76, on disk 77 fast to drive shaft 11, engaging arm 72 fast to shaft 54, thus rocking the shaft as required in a clockwise direction. While roller 76 is in engagement with arm 72 one of a pair of rollers 78 on gear 4 engages the forward end 79 (Fig. 18) of plate 59 thus rocking the plate to normal position with its shoulder 58 beneath pawl 57. The return movement of plate 59, through the link 65 pushing upward on bell crank lever 62, restores shaft 63 to normal position which permits release of the depressed department key as described later.

On total printing operations the driving mechanism of the machine is permitted to go through two ordinary operations and in order to make the machine stopping mechanism ineffective at the end of the first operation of the driving mechanism, pitman 74 is moved forwardly carrying the roller 73 out of engagement with the curved surface 75 of the lever 67, as shown on Figs. 2 and 18. The parts will then be in the position shown in Fig. 18. Then the first engagement between one of the rollers 78 and the forward end of plate 59 is not effective to restore shaft 63 as pin 73 is not in position to engage the face 75 of lever 67 and thereby compel the toggle connection between plate 59 and arm 62 on shaft 63 to move upward as a rigid unit. For this reason the shaft 63 is not returned to normal position and the plate 59 is returned to its releasing position as shown in Fig. 18, as the member 67 is free to rock clockwise around the pivot 68 when the member 59 moves clockwise. At the completion of the second operation of the driving mechanism the pitman is in normal position and the roller 73 is in position to perform its function of preventing a rocking movement of the member 67 and thereby controls the restoring of a rod 139 (Fig. 12) to beneath a shoulder 138 on a detent 134 hereinafter described. The shaft 63 is thus held in such an angular position that plate 59 can not rock clockwise around its pivot 60.

The drawings show the machine as it would appear provided with a manually operative crank for the purpose of being so driven, but it is also intended that the machine be provided with an electric motor and clutch to connect the motor with the driving mechanism. When a motor is employed it is desired to open the motor circuit and disconnect the clutch from the driving mechansim slightly before the driving mechanism of the machine reaches its home position. In such case in order to insure complete operation of the driving mechanism, that is, not relying entirely upon its momentum, drive shaft 6 is provided with a cam 80 (Fig. 2) which, at the end of operations, is engaged at a surface 81 by a roller 82 carried on an arm 83 pivoted on a stub shaft 84 and urged upwardly by a spring 85 extended between arm 83 and a pin on one of the machine frames.

Keyboard.

Figure 1:
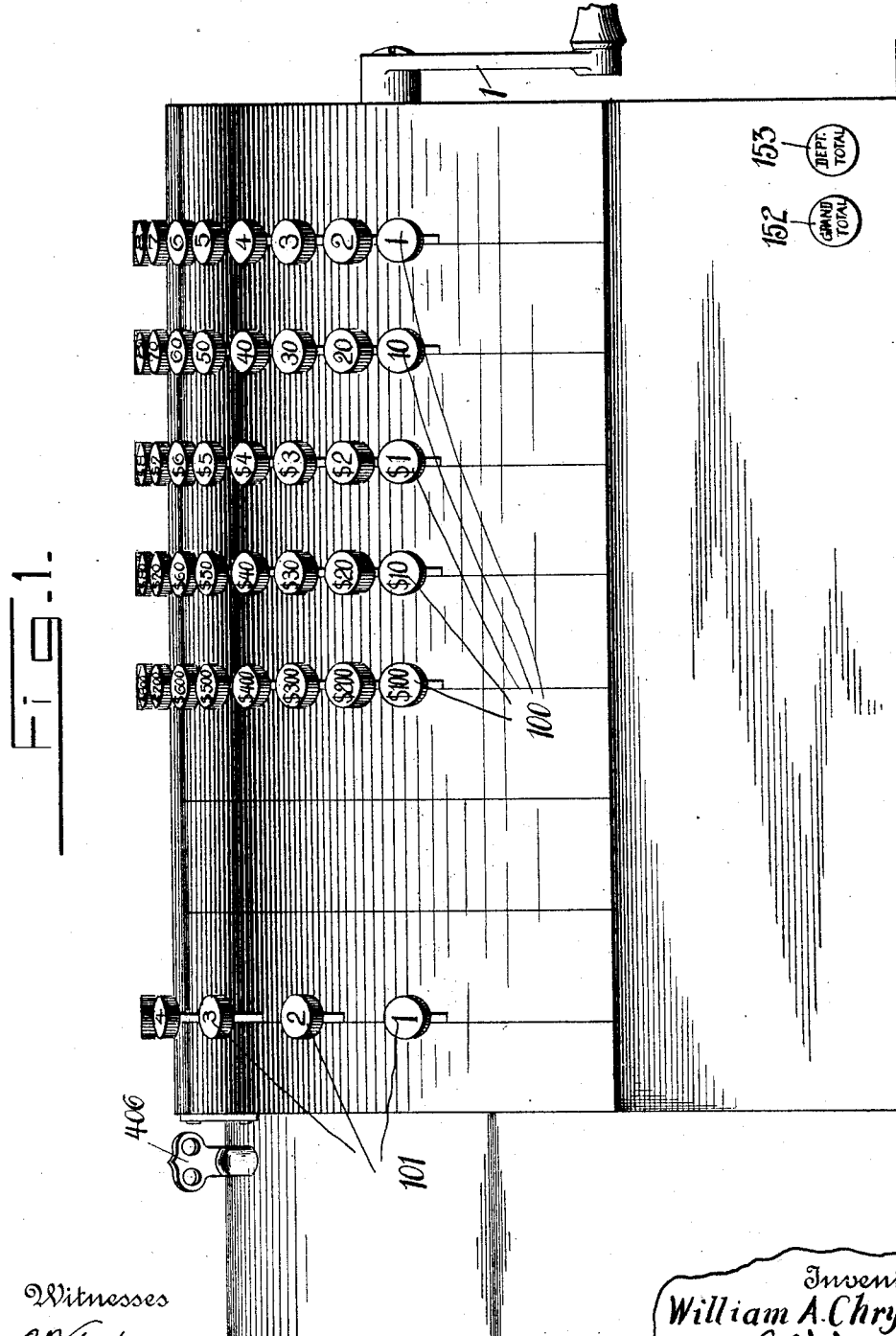
Figure 1 is a front view of the machine.

Operations of the machine are controlled by a keyboard comprising a plurality of banks of value keys 100 (Figs. 1, 7 and 8) and a single bank of department keys 101 (Figs. 1 and 12). The purpose of the value keys, as usual, is to control the operation of differential mechanism in order that the totalizer elements may be rotated differentially and type carriers set when items are entered. The object of the bank of department keys is to control differential mechanism for selecting department totalizers for operation and setting a corresponding type carrier in printing mechanism.

The construction of a bank of value keys is shown in Figs. 8 to 10 inclusive. All of the elements required in a bank of value keys are mounted in a unit comprising a supporting frame 102. These frames are all supported by cross rods 103 and 104. Each key is provided with a pin 105 which extends across the upper end of a corresponding spring 106 and between corresponding arms 107 and 108 respectively on plates 109 and 110. Thus when a key is depressed it causes the compression of its spring 106 and consequently the spring serves to restore the key to normal position when the latter is finally released. By means of the plates 109 and 110 all of the springs may be assembled on these plates previous to the final assembling of the machine. To place springs on the plates the same are brought together in pairs with the arms 107 and 108 opposite each other. The springs are then slipped over the arms and the plates moved relatively to each other so that shoulders 111 are brought over the upper edges of the springs, thereby retaining the latter in place. Screws 112 are then passed through holes in the plates thereby retaining the plates in such relative position that the springs are retained in position. The screws 112 also serve for fastening plates 109 and 110 to key frames 102.

The keys coöperate with the key detents 113 and locking plates 114 which are respectively supported by arms 115 and 116, 117 and 118 pivoted by pins 119 to the key frames 102. The detent 113 temporarily retains keys in depressed position and operates a zero stop for the differential mechanism, and for this purpose is provided with a plurality of pins 120 for coöperating with shoulders 121 on the keys. When a key is depressed the inclined edge of shoulder 121 engages a pin 120 thus forcing the detent downwardly swinging arms 115 and 116 around pins 119. Extending across the forward edge of arm 116 is a pin 123 on a zero stop pawl 124 pivoted by a pin 125 to a plate 129 secured rigidly to the frame 102. The pawl 124 has a forwardly extending tail 127 which is connected by a spring 128 to a pin on the key frame. Thus the spring normally holds the zero pawl in the position shown in Fig. 8 and through the pin 123 holds detent plate 113 in its upper position as shown. When a key is depressed, downward movement of detent 113 occurs until shoulder 121 on the key has passed the pin when the detent rises, slightly under the action of spring 128, retaining the key in its depressed position. The downward movement of the detent by arm 116 engaging pin 123 serves to rock zero stop 124 forwardly and it is retained in its forward position as long as the key is depressed, the slight upward movement of the detent when pin 120 passes in front of shoulder 121 on the key not being sufficient to permit the return of the stop 124 into operative relation with the differential mechanism, to be described farther on.

The locking plate 114 is provided with extensions 130 to pass over the pin 105 on a depressed key and to pass beneath pins 105 on undepressed keys thereby preventing manipulation of all of the keys during operation of the machine. In order to give the locking plates 114 the required upward movement, the supporting arm 117 for each locking plate is provided with an extension 131 extending over the rod 139 carried by arms 140 fast to the shaft 63. This shaft is rocked in a counter-clockwise direction (Fig. 8) on depression of a department key and therefore causes rod 139 to engage the extension 131 and lift the locking plate 114.

The department keys 101 (Fig. 12) are also slidably mounted in a key frame 102 and are depressible against the action of springs in the manner of the amount keys. Coöperating with pins 132 on the department keys is the detent plate 134 provided with curved cam slots 133 into the appropriate one of which the pin 132 on the depressed key enters to raise the detent plate. The detent 134 is pivoted on arms 135 and 136 by pins 137 and the said arms are pivotally hung from pins 119 (Figs. 8 and 12). The upper end of detent 134 is provided with the curved extension 138 normally resting on the rod 139 carried by the arms 140 on shaft 63. Also in operative relation with rod 139 is a pawl 141 pivoted to the detent 134 by a pin 142. When a department key is depressed the detent 134 is cammed upwardly by engagement of the pin 132 on the key with a curved slot 133 and the upward movement of the detent causes shoulder 138 to pass out of engagement with the rod 139 and the latter to engage pawl 141, rocking it out of its path. The rod 139 is then free to rock upwardly in the notch formed in the detent by extension or shoulder 138 and a clockwise rocking of shaft 63 occurs as urged by spring 61. (Fig. 2). Thus the depression of a department key permits operation of the machine releasing mechanism as previously described.

The total key 152 (Fig. 21) for controlling the printing of totals and subtotals from the main totalizer, and to be described farther on, has connections for engaging and lifting detent 134 (Fig. 12) at a slot 144 formed in the lower end of the detent 134 in order that it may cause the detent to release the machine when it is desired to print a total or subtotal from the main totalizer, at which time it is desired to prevent the department keys from being depressed so that the department totalizer selecting mechanism will not be operable. A zero stop lever 146 pivotally mounted on the frame for the bank of department keys by a pin 147 carries a pin 145 for engaging the detent 134 at the slot 144. A downward extension 148 of the zero stop 146 has a pin 149 in position to be engaged by an arm 150 on a shaft 151. On the depression of the main total key this shaft is rocked, thus causing arm 150 to engage pin 149 causing the zero stop to lift detent 134 and also to move into the path of the differential mechanism for this bank, which will be described farther on.

The total keys 152 and 153 (Figs. 1, 4, 19, 20 and 21) are slidably mounted on a stud 154 projecting from the machine frame and a rod 155 extending across the machine. The key 152 is employed when it is desired to print a total or subtotal from the main totalizer and consequently it has connections for rocking shaft 151 so that the machine may be released by causing an upward movement of detent 134 (Fig. 12). For this purpose the shank of key 152 has a notch 156 (Fig. 18) into which extends an arm 157 fast to the shaft 151.

Both total keys 152 and 153 have connections for making the machine locking mechanism inoperative until the driving mechanism has gone through two ordinary operations in order that the first operation may be employed to position to normal any mechanism which may have been left in moved position on a preceding entry of an item. The latching mechanism for both keys which serves to retain the keys in depressed position is operative to release the depressed total key at the end of the first rotation of the drive shafts. When this occurs a subtotal is printed leaving the operated totalizer in its original position. If it is desired to print a total and reset the totalizer to zero the depressed key is manually retained in depressed position during the two operations of the driving mechanism, thus making the total key releasing mechanism ineffective until these two operations have been completed. Following this plan both keys have connections for reversing the operation of the totalizer engaging mechanism previously described and shown in Fig. 4 so that the totalizers will not be engaged with their actuators until the first rotation of the drive shafts is practically completed. The totalizers are held in engagement a length of time depending upon whether it is desired to print a total or a subtotal.

The shank of each key (Figs. 4, 19, 20 and 21) has a laterally extending flange 158 extending across the rear edges of both plates 33 and the pawls 45 pivoted thereon, the one on the main totalizer key being shown extending over the one on the department totalizer key. Consequently when a total key is depressed both the two plates 33 and the two pawls 45 will be rocked counter-clockwise around their pivots 34 against the action of springs 51 and 52 (Fig. 4) to an intermediate or neutral position. This rocking movement of plates 33 to intermediate position disengages them from the roller 31 on bell crank lever 30 and brings their lower ends to the position shown in Fig. 21 in which the projections 178 on the lower ends of the plates are not in the path of the roller 46 on the lever 47 but the rearwardly projecting fingers on the pawls 45 are in the path of the roller 46. Mounted between the keys 152 and 153 are a pair of duplicate selector slides 159 and 160 on which pawls 162 are pivotally mounted by pins 161 for coöperating with a stud 163 projecting from either side of an arm 164 fast on an oscillating shaft 165. Springs 166 connected to the pawls by links 1661, normally urge pawls 162 to rock clockwise into operative relation with the stud 163, but the pawls are normally prevented from such movement and held in the position shown in Fig. 19 by pins 167 on pawls 168 pivoted on shaft 165 and also having pins 169 normally resting on shoulders 170 of the keys 152 and 153. The pins 167 coöperate with shoulders 171 on pawls 162 and springs 172 cause a disengagement of pawls 168 with pawls 162 when the corresponding key 152 or 153 is depressed far enough to permit pin 169 to rock downwardly clear of shoulder 170.

Oscillation of shaft 165 is effected by a cam 173 (Fig. 22) fast to drive shaft 6 and coöperating with a pitman 174 which is supported by the drive shaft at its rear end and at its forward end is pivoted to an arm 175 fast to shaft 165. Cam 173 is so placed on shaft 6 that while bell crank levers 30 and 47 on total printing operations, are being idly rocked to carry their rollers 31 and 46 toward each other the forward rocking of arm 164 will take place. This forward movement is sufficient to carry the stud 163 sufficiently forward to pass in front of a recess 1647 in the forward end of the pawl 162. When the stud 163 moves forwardly out of engagement with the lower edge of the pawl 162 the spring 166 rocks the pawl counter-clockwise and this movement of the pawl is arrested by engagement of the forwardly and upwardly extending finger on the forward end of the pawl with the stud. Then upon the return of the arm 164 which occurs between the 270th and 320th degrees of movement of the drive shafts the stud 163 will engage with the recess 1647 of the operated pawl 162 and through this pawl carry the corresponding slide 159 or 160 rearwardly so that just before the 320th degree of movement on the first rotation of the drive shafts the rear edge 176 of the slide will engage a pin 177 on the plate 33 corresponding to the total key depressed. In this manner the plate is rocked still farther counter-clockwise so that its shoulder 178 is brought beneath roller 46 on bell crank lever 47 which at such time is at rest in its moved position. Then whether the depressed total key is released or not the selected plate 33 will be lowered by engagement of the roller 46 with the shoulder 178 on the return movement of bell crank levers 30 and 47 which takes place during the last 35 degrees of first rotation of the drive shafts as in either event cam 173 will retain the slide 159 or 160 in its rear position during such time. In this manner the selected totalizer is engaged with the actuating mechanism near the end of the first rotation of the driving mechanism. As the selector slide for the depressed total key is moved rearwardly a pin 196 on arm 1967 of the slide engages an arm 192 of the pawl 168 and forces the latter clockwise about its pivot 165 to disengage its pin 169 from in front of projection 170 of the depressed total key and release the latter and allow it to be restored by a key spring 1521 to undepressed position. When the depressed key is restored to normal position the pawls 45 are released and allowed to be moved forwardly by their springs 52 as the rear edges 176 of the slides are not in alinement with the pawls and do not serve to hold them rearwardly after the key has been released. The slides 159 and 160 are between the total keys and the plates 33 are between the pawls 45 and each of the slides has a flange 199 the one on the slide for the main totalizer key when they are in normal position being over the one on the slide for the department totalizer key and when either slide is in rearmost position to hold its plate 33 in its extreme rearmost position, its flange 199 engages the other plate 33 and retains this other plate in the neutral position in which the plates 33 are shown in Fig. 21 and in which it will not engage with the rollers 31 or 46 after the depressed key has been released. It can be seen that if the plate 33 for the unoperated total key were not held in neutral position it would rock to its normal position when the roller 31 is moved to its normal position near the beginning of the second operation of the machine and therefore effect engagement of an extra totalizer. The flanges 199 on the slides are not of sufficient length however to engage the pawls 45 which are left free in their forward position when the depressed key returns forwardly. The selected totalizer is engaged with the actuators in a total or sub-total taking operation at the same time that the totalizer is disengaged from the actuators during an item entering operation. Thus the total keys serve to reverse the normal time of engagement but the printing of a total or subtotal depends upon whether or not the total key is retained in its depressed position throughout the second operation of the driving mechanism. If the key is released near the end of the first rotation of the drive shafts the totalizer, as required for printing a subtotal, will remain in engagement during nearly the entire second rotation of the drive shafts, as the release of the total key permits pawls 45 to rock forwardly around the pivots 34. Consequently on the second clockwise rocking of bell crank lever 47 which occurs between the 160th and 200th degree of second rotation of the drive shafts the totalizer engaging mechanism will not be disturbed as the roller 46 does not engage the pawl 45, whereas if the pawl 45 were held in its rear position as shown in Fig. 21 by its corresponding total key being retained depressed engagement of the roller 46 with the projection on the pawl 45 during the second upward clockwise rocking of bell crank lever 47 would carry this pawl 45 and corresponding plate 33 upwardly thereby disengaging the totalizer when reset from its actuating mechanism, the final restoring movement of bell crank lever 47 being idle. If the total key is released at the end of the first rotation of the drive shaft bell crank lever 47 subsequently upon the second rotation of the shaft rocks idly in a clockwise direction, then when the bell crank lever 47 has reached the limit of its movement in this direction, roller 31 registers with notch 32 in the plate 33 which has been displaced from normal. At this time the slide 159 or 160 is released and moved forwardly so that the plate 33 rocks to the right under the action of its spring 51 engaging the pin 31 on bell crank lever 30. Then the final restoring movement of the bell crank levers 30 and 47 serves through the former to carry the plate 33 back to home position and consequently disengage the totalizer from its actuating racks at the end of the second rotation of the drive shaft.

Movement of either selector slide 159 for the main totalizer key or 160 for the department totalizer key to their rearmost position as above described serves through pin 196 and arm 192 of pawl 168 to return this pawl to normal position and thus release the depressed total key. For this purpose each selector slide has a pin 196 in position to engage the arm 192 of the pawl. A pawl 198 is pivoted to each key 152 and 153, and when a pawl 168 is restored pawl 198 rocks to beneath pin 169 preventing a relatching of a total key if it is held in depressed position. Normally the pawl 198 extends above pin 169 and is thereby pushed forwardly on the depression of a total key and does not interfere with latching the key.

When arm 164 moves forward upon the second rotation of the drive shaft the displaced slide 159 or 160 returns to normal position under the action of its spring 166 and the pin 167 engages the shoulder 171 of the pawl 162 restoring and holding the pawl in normal position. Arm 164 then returns freely to its normal position as shown in Fig. 21.

To prevent simultaneous depression of the total keys each key is provided with a pin 194, one above and one below a plate 195 pivoted on shaft 154. Depression of the main total key 152 by its pin 194 engaging a shoulder on the plate rocks it upwardly into the path of pin 194 on the department total key thus preventing its depression. When the department total key is depressed its pin 194 prevents the plate from rocking upward and thereby prevents depression of the main total key.

Both total keys have connections which when depressed prevent depression of any of the value keys. This mechanism includes a shaft 179 (Figs. 7 and 8) which carries a pair of arms 180 at the inner ends of which is secured a rod 181. This rod is in such position that when rocked downwardly it will move in front of curved extensions 182 of arms 116 supporting the key detents 113, thus preventing forward rocking of the arms and consequently the downward movement of detents 113, which movement is necessary in order to depress value keys. In this manner all of the value keys are locked against operation on total and subtotal printing operations. The connection between shaft 179 and the total keys 152 and 153 is shown in Figs. 4, 18, 19, 20, and 21. Fig. 18 shows the shaft in its rocked position as would be the case with one of the keys depressed. It was previously explained how the main total key 152 rocks shaft 151 counter-clockwise by means of the arm 157 fast to the shaft. The shaft also carries an arm 183 (Fig. 21) having a pin 184 extending across the rear of a pawl 185 loose on shaft 151 and normally held in a rear position by a spring 186 (Fig. 4). The nose of pawl 185 is normally at the rear of a pin 187 on a by-pass pawl 188 pivoted at the lower end of a bell crank 189 loose on shaft 179 and having an arm 1891 extending over rod 181. Consequently when the main totalizer key is depressed pin 184 engages the rear of pawl 185 rocking it forward and through the pin 187 on pawl 188, bell crank 189 is rocked in a clockwise direction (Fig. 4). Consequently the rod 181 is carried downward thereby locking the value keys.

The department total key 153 (Fig. 21) also has a notch in this case numbered 190, for engaging an arm 191 which is loosely journaled on shaft 151, but rigid with an arm 1922 having a pin 193 extending across the rear of pawl 185 as is the case with the previously described pin 184. Consequently when the department total key 153 is depressed, as is indicated in Fig. 21, the pawl 185 is rocked forward locking the value keys in the same manner as when the main total key 152 is depressed, but as the arm 191 is loose on shaft 151 it will not alter the angular setting of this shaft. It was previously pointed out that shaft 151 is rocked by the depression of the main total key 153 for the purpose of releasing the machine by rocking the zero stop 146 (Fig. 12) of the bank of department keys to operative position to prevent a selection of department totalizers and also to release the machine by lifting the detent 134.

*Differential mechanism.*

The differential mechanism of the machine is employed differentially to operate the totalizers and to select them for operation and also set the type carriers in the printing mechanism as controlled by the banks of value keys and the banks of department keys.

Figure 6:
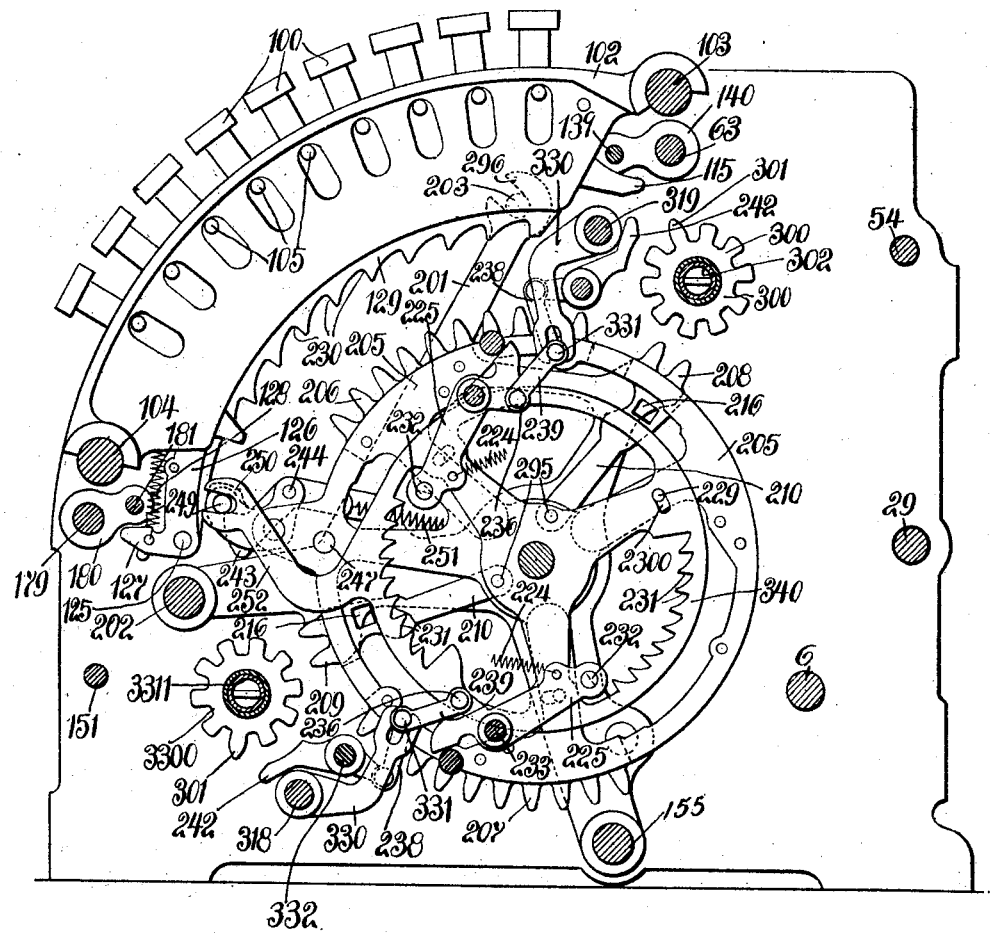
Fig. 6 is a transverse vertical section of the machine taken at the side of one of the banks of value keys.

That part of the differential mechanism controlled by the value keys comprises a plurality of sections one of which is provided for each bank of keys and is clearly shown in Figs. 6, 7, and 11. Each section consists of a pair of frames 200 and 201 secured together by the sleeves 299 and sleeves 297 and 298 (Fig. 11). The mechanism of each section is mounted within the frames 200 and 201. Supporting tie rods 202 and 155 of the machine pass through the sleeves 297 and 298 and studs 203 on the respective key frames are engaged by jaws 296 formed in the upper parts of all the frames 200 and 201. Pivoted on sleeve 299 near the center of the unit is a differentially movable member 205 circular in form and having riveted thereto a pair of racks 206 and 207 for respectively operating the main totalizer 300 and the department totalizers 3300. Pairs of teeth 208 and 209 are mounted in alinement with the racks 206 and 207 but are movable relatively of the racks and the differentially movable member 205 for the purpose of providing for carrying operations. The teeth 208 and 209 are cut in arms 210 pivoted to the members 205 by pins 295. Pivoted to the arms 210 by pins 212 are arms 213 having pins 214 for engaging shoulders 215 on the members 205 and in notches 2151 therein. Springs 211 hold the arms 213 in such position during differential movement of the members 205 that the pin 214 is locked in engagement in the recess 2151 so that the racks 208 and 209 and their arms 210 move as a unit. The arms 213 are provided with pins 216 (Fig. 11) which normally abut the ends 217 of transfer plates 218 when the differential members arrive at zero position, but these members are normally given a single unit of movement beyond a zero position to normal position and consequently the abutment of pins 216 with the plates 218 causes the arms 213 to be rocked around their pivots 212 and become disengaged from the recesses 2151 in the shoulders 215. Consequently the racks 206 and 207 will normally move one unit farther than the teeth 208 and 209 which during this extra movement are in engagement with the totalizer being operated. The totalizer pinions are each provided with a long tooth 301 which, when a pinion passes from nine to zero, engages an arm 227 normally held by a spring 228 in the path of the tooth 301. Rigid with arm 227 is an arm 223 having a pin 222 normally in engagement with a shoulder 221 formed in a slot 220 in the transfer plate 218. A spring 224 urges the transfer plate to rock clockwise (Fig. 11) and thus carry its end 217 out of the path of pin 216. On carrying operations when the arm 227 is engaged by one of the long teeth 301, pin 222 is carried out of engagement with the shoulder 221, thus permitting plate 218 to rock clockwise as urged by its spring 224. Such movement carries the end 217 out of the path of pin 216 and brings a shoulder 226 into the path of the pin to regulate the movement of arm 210. When this occurs the arm 210 remaining locked to the member 205 at the notch 2151 in the shoulder 215 moves an extra step past zero position with the corresponding rack and therefore the transfer is effected positively.

The members 205 are differentially driven as controlled by the banks of keys by the segments 21 (Fig. 7) which have a constant movement as previously described. The segments are normally connected to the differential members 205 by means of latches 243 which are supported by arms 245 and 246 (Fig. 11) pivoted by pins 247 and 248, to the members 205 and by pins 244 to the latches 243. The outer ends of the latches are formed to engage with notches 230 formed in the plates 129 fast to key supports 102. (Fig. 8). Integral with the arm 246 is an extending arm 250 (Fig. 7) suitably formed to engage the inner ends of depressed keys. A spring 251 extending from a pin on the member 205 and one of the pivots 244 normally holds the latch mechanism in the position shown in Fig. 7 with the latch 243 in engagement with a shoulder 2432 on segment 21. Consequently when the segment 21 rocks counter-clockwise as driven by cams 12 and 13 it carries the latch 243 with it and consequently the differential members 205 up to the point where arm 250 engages a depressed key, such engagement resulting in the arm 250 rocking clockwise around pivot 248, thus carrying with it the arm 246 and consequently disengaging latch 243 from the shoulder 2432 on segment 21 and engaging it with the particular notch 230 which is opposite the latch at such time. Continued movement of segments 21 under the action of cams 12 and 13 is idle, permitting the members 205 to remain at rest while at the end of the counter-clockwise oscillation of the segments 21 the totalizers are engaged with the positioned racks 206 and 207 for adding operations. On the return movement of members 21 when the notches therein forming the shoulders 2432 arrive opposite latches 243 the latter spring into engagement with the notches thus becoming disengaged from plate 129 and are then carried downward together with the members 205 and thus differentially rotate the totalizers with which the racks 206 and 207 are in engagement. The return movement of members 205 is positively effected by segments 21 engaging pins 2051 on members 205. (Fig. 7).

After an adding operation all displaced transfer devices are restored to normal position at the next operation of the machine by three armed levers 2001 (Fig. 11) pivoted concentrically with the differential mechanism. A pin 2002 on an arm of each three armed lever is engaged by a shoulder 2003 (Fig. 7) on a segment 21 of the next bank as the segments in their counter-clockwise stroke reach their nine positions, thus rocking the ends of the levers 2001 into engagement with shoulders 2004 of the transfer plates 218. By this means the transfer plates are returned to normal position and permit the pins 222 to relatch them in such position and the pawls 227 to return to operative relation with the totalizer pinions.

The type carriers are differentially set while the latches are in engagement with notches 230 in the plates 129. Pivoted on the pins 247 are links 280 (Fig. 7) connecting the latches with type carriers so that the differential movement of the members 205 may communicate to the type carriers. The rear ends of links 280 are pivoted by pins 281 to links 282 which, at their upper ends, are pivoted by pins 283 to arms 284 fast on sleeves 285 which latter, as shown in Fig. 24, carry segment gears 286 meshing with pinions 287 fast to sleeves 288 on which are secured the type carriers 289 (Fig. 23). The upward movement of latches 243 serves to idly rock the links 280 around the pivots 281 regardless of the position of these pivots unless the type carriers at the beginning of the operation are standing at a position indicating a number lower than that to be printed upon the operation of the machine when the positioning of the links 280 by the latches 243 due to the engagement of the center of the links with the sleeve 299 will cause the type carriers through their connection 282 with the rear ends of the links to be positively positioned by adjustment of the latches alone. While the links 280 are being thus rocked rollers 290 on the bell crank levers 16 controlled by the cams 12 and 13 will engage the center part 2901 of the links forcing the same into engagement with sleeves 299 unless the links are already in engagement with the sleeves or are moved in engagement with them by the movement of the latches alone as would be the case when the type carriers are being set from a lower to a higher indicating position. According to this mechanism as the forward ends of links 280 are differentially set according to the keys depressed rollers 290 insure the center of the links being in engagement with the sleeves 299, at the end of forward movement of the differential mechanism, the links assuming an angular position corresponding to the location of the keys depressed and thus through links 282, arms 284 and sleeves 285 insuring the rotation of the type setting segments 286 differentially and forwardly or backwardly as is required to rotate the type carriers directly from one setting to any other desired setting.

In total printing operations movement of the members 205 and consequently the setting of the type carriers is determined by the long teeth 301 on the totalizer pinions which, when the pinions arrive at zero position, engage pawls 242 (Fig. 11) which have been previously rocked into their paths, rocking these pawls counter-clockwise and operating mechanism for differentially stopping the members 205.

For the purpose of rocking pawls 242 into operative relation with the teeth 301 the pitman 74 (Fig. 18) is used. As previously stated, the pitman 74 is moved slightly forward after the depression of one of the total keys. Further forward movement of the pitman is accomplished however upon the operation of the driving mechanism by cams 1002 on gear 4 (Figs. 2 and 18). Depression of either total key serves to shift pitman 74 slightly forward, thus bringing its roller 1001 into operative relation with one of the cams. The normal position of the pitman is shown in Fig. 2, and in Fig. 18 the pitman is shown in the position it assumes after the depression of a total key. The depression of either total key serves to rock shaft 179 slightly clockwise as before explained in connection with the description of the means for preventing manipulation of value keys on total printing operations. Rigid with shaft 179 is an arm 1107 provided with a pin at its lower end for supporting the forward end of pitman 74. It will thus be seen how a slight clockwise rocking of shaft 179 brings the pitman to the position in which it is shown in Fig. 18. The pitman carries rollers 1003 passing through slots in plates 1004 pivoted by pins 1005 to arms 1006 fast on shafts 318 and 319. The shafts 318 and 319 carry loosely levers 317 having at one end a pin 324 extending through L slots in plates 1004. The levers 317 at their other ends are forked at 316 (Fig. 2) over rollers 307 and 315 on the ends of shafts 305 and 336. These shafts support the frames in which the totalizers are mounted and have a bodily inward movement whenever the totalizers are engaged with their actuators. The engaging movement of the totalizers thereby rocks levers 317 around shafts 318 and 319. Pitman 74 remains in its normal position as shown in Fig. 2 when items are entered in the machine and therefore the rocking of levers 317 is idle as the rollers 324 move idly along the slots in plates 1004. After pitman 74 is made operative with respect to cams 1002 by the depression of a total key it is carried still farther forwardly by the inclined portion 1007 of one of the cams upon the operation of the driving mechanism. This further forward movement of the pitman through pins 1003 adjusts plates 1004 so that the offset part of their slots engage pins 324 on levers 317. Therefore when levers 317 are rocked on the engagement of totalizers during total printing operations the plates 1004 will be carried with the levers thereby through arms 1006 rocking shafts 318 and 319. The shafts 318 and 319 as shown in Fig. 6, carry fast forked arms 330. The forked part of these arms encircle pivot pins 331 which connect links 238 and 239 respectively pivoted to arms 240 (Fig. 11) integral with pawls 242 loose on shafts 332 and pins 236 on levers 225 pivoted by pins 233 to the frames 200. Rocking of shafts 318 and 319 is in a clockwise direction (Fig. 6), and therefore the arms 330 will shift rollers 331 accordingly and tend to straighten the links 238 and 239 with respect to each other. This movement causes pawls 242 to rock toward the totalizer pinions as movement of the arms 225 is prevented by springs 224 connecting these arms with the transfer plates 218. Cams 1002 which operate pitman 74 on total printing operations also prevents the return of the pitman to normal position under the action of its spring 334 until after the totalizer pinions have been backwardly rotated to zero position. When a totalizer pinion arrives at zero position its long tooth 301 engages one of pawls 242 rocking the pawl and thereby through its respective arm 240 pushing downward on link 238 and as pin 331 is held against lateral movement, also pushing inward on links 239 thereby causing these links to move in the direction of their length and swing their respective arm 225 around its pivot 233 causing a flat sided pin 232 thereon to engage one of the teeth 231 cut in plate 340. The plate 340 is connected with the differential members 205 by pins 229 on the latter members extending through slots 2300 on the plates 340. The plates therefore may have a slight relative movement with respect to the members 205. The plates 340 have forwardly extending arms 252 provided with notches for encircling pins 249 on forwardly extending arms 250 of arms 246 supporting latches 243. By this arrangement when a totalizer pinion arrives at zero and the respective plate 340 is stopped by pin 232, the first thing that occurs is a slight relative movement between the plates 340 and the supporting member 205, thus causing arm 246 to rock counter-clockwise (Fig. 11) and disengage the latch 243 from the corresponding driving segment 21 (Fig. 7). Pins 232 therefore serve to stop the differential mechanism at a point determined by the totalizer while at the same time disengaging latch 243 from the driving segment 21 and permitting the latter to continue its movement independently of the differential member 205, the latter having connections to control the setting of the type carriers as previously described.

It may frequently occur on total printing operations that some of the totalizer pinions stand at zero position at the time the pawls 242 are rocked toward the totalizers by the movement of forked arms 330 (Fig. 6). In such case the pawls 242 would immediately engage with the long teeth 301 of the pinion standing at zero and thereby further movement of pawls 242 is prevented, which results in the link 238 swinging around its pivotal connection to arm 240 and thereby forcing its companion link 239 downwardly and rocking arm 225 against the action of its spring 224 into position to engage its pin 232 with the first of the corresponding series of teeth 231 in the plate 340 therefore movement of the latter is prevented and the respective latch 243 is operated to release the differential member 205 from its driving segment 21 at the zero position when the latter starts to rotate.

The forward movement of pitman 74 (Fig. 18) under the action of one of the cams 1002 is employed to move noses 26 on all of the zero stop pawls 124 (Fig. 8) to inoperative positions so that the differential members 205 (Fig. 7) under the control of the value keys may be permitted to move upwardly as controlled by the totalizer on resetting operations, but this rearward movement of pitman 74 does not take place until after the time of the usual forward movement of the actuators. Therefore movement of the differential mechanism beyond the zero stops is prevented until after totalizer selecting has been accomplished. As before mentioned, the forward end of pitman 74 is pivoted to an arm 1107 fast to the shaft 179. It was also stated that this shaft was given a preliminary movement on the depression of one of the total keys for the purpose of bringing the roller 1001 on the pitman into operative relation with cam 1002 and also to rock rod 181 (Fig. 8) slightly downward before the extensions 182 on the arms 116 of the key detents for the value keys, thereby preventing depression of said keys on total printing operations. The further rocking movement of shaft 179 under the action of pitman 74 causes the rod 181 to engage forward extensions 127 on the zero stops 124 and thereby rock the same to inoperative positions.

*Totalizers.*

The totalizers are shown in detail in Figs. 14 to 17 and their relation to the remainder of the machine is well shown in Fig. 7. The main totalizer 300 (Figs. 14 and 15) consists of a number of pinions loosely journaled on a tube 302 pinned to frames 304. The hubs of the pinions serve properly to space the same on the tube. The frames 304 have journals 3041 through which passes the shaft 305. This shaft has the rollers 307 at its ends passing through rigid plates 308 and 309. These plates are provided with slots 310 as shown in Fig. 15 permitting a downward movement of the shaft sufficiently to carry the totalizer pinions from their normal position as shown in Figs. 6 and 14 into engagement with the actuators 206. Such movement of the totalizer is normally prevented by the plates 308 and 309 through slots 3001 of which extend rollers 322 and 324 on arms 320 and 323 pinned to shaft 305. The arm 320 is provided with a roller 321 which extends through the slot 44 in arm 42 (Fig. 4). Arm 42 is given a rocking movement on operations of the machine, as before explained, and therefore rocks arm 320 and shaft 305 first counter-clockwise (Fig. 15) causing the rollers 322 and 324 to engage their respective slots 3001 and thereby compel the shaft 305, frames 304 and the main totalizer to be moved downwardly into engagement with the actuators. After the latter have been operated the return rocking movement of arm 42 effects disengagement of the totalizer, the roller 307 of the ends of the shaft 305 moving downwardly in the slots 310.

The shaft 305 carries rigidly a pair of two armed cams 327 for coöperating with a pair of cam arms 325 loose on either end of shaft 306 extending between the frames 304. The cam arms 325 carry an alining plate 326 for engaging the totalizer pinions and preventing their rotation when out of engagement with their actuators. When the shaft 305 is rocked to carry the totalizers into engagement cams 327 engage the shoulders 328 of arms 325 rocking the same and disengaging the plate 326 from the totalizer pinions. On the reverse rocking of shaft 305 on the disengagement of totalizer pinions the cams 327 engage the extensions 329 of arms 325 thereby again reëngaging plate 326 with the totalizer pinions. This construction provides a simple means for preventing rotation of the totalizer pinions except when in engagement with the actuators, as it is operative to cause the plate 326 to remain in engagement with the pinions until the same are fully meshed with the actuators. The plates also reëngage the totalizer pinions immediately when the same start to move out of engagement with their actuators.

The pinions of the department totalizers 3300 (Figs. 16 and 17) are somewhat similarly mounted but also have a lateral movement so that any desired one of the department totalizers may be positioned for engagement with the differential mechanism. The department totalizers 3300 consist of a plurality of groups of pinions loosely journaled on a tube 3311 fixed in frames 333 and 334. These frames are provided with rollers 335 in position to engage the shaft 336 corresponding to the shaft 305 above described, and have arms 351 and 352 provided with rollers 353 extending into cam slots 3002 (Fig. 17) in fixed plates 354 and 355. The arm 351 on shaft 336 is also provided as above stated with a roller 321 extending through slot 44 in the lever 41 (Fig. 4) whereby rocking movement of this lever causes the arm 351 and shaft 336 to rock and to be cammed so as to carry the selected totalizer into and out of engagement with the actuators 207, the slots 3002 in the rigid plates 354 controlling the operation. Rocking movement of shaft 336 through a pair of cams 327 controls the operation of the alining device 326 for this set of totalizers the same as the alining device for the main totalizer above described. In order that pinions of unoperated totalizers are not free to rotate when one of the sets of totalizer pinions are engaged with the actuators 207, the fixed frames 200 and 201 which support these actuators are provided with teeth 2011 (Figs. 12 and 16) for the totalizer pinions to engage when one of the totalizers is meshed with the actuators. Each totalizer of the department totalizers consists of one pinion in each group of pinions, therefore if the first pinion of each group is engaged with the actuators 207 a certain department totalizer will be operated; if the second pinion of each group is engaged with the actuators a different totalizer will be operated, etc. This arrangement of multiple totalizers is described in a U. S. Letters Patent No. 1,109,763, granted Sept. 8, 1914 to Chas. F. Kettering.

To shift the multiple totalizer unit along shaft 336 so that any desired totalizer may be brought opposite the actuators the frame 334 is provided with a boss 337 in which is secured a rod 338 provided with a roller 339 loose on the rod which extends into a groove 340 in a cam 341 (Figs. 12 and 13). The cam 341 is journaled on a rod 342 and has a rearwardly extending arm 343 having a pin 344 by which it is connected to a beam 345 supported at its forward end by pivot 346 of a differential member 3461 which supports a latch 347 for the bank of department keys. This latch is carried upwardly by one of the segments 21 previously described, until the latch engages a depressed key when it is disengaged from the segment 21 and engaged with one of the notches 230 in plate 129 of the department key bank thereby differentially setting the member 3461 and causing the beam 345 to assume a certain angular position with respect to its pivot 344. Roller 290 on one of the members 16 also engages the beam at a central point thereby setting the beam at a definite angle determined by the depressed key and the rod 342. By this means through a link 348, an arm 349 fast on one of the sleeves 285 and corresponding connections between the sleeve and the department type carrier the department type carrier is set and also through the pin 344 cam 341 is operated to shift the multiple totalizer unit from its previous setting to any desired new setting.

The cam 341 is provided with a plurality of holes 350 corresponding to all of its possible positions with respect to the rod 338. After the multiple totalizer unit is set the selected totalizer is engaged with the actuators 207 thereby causing rod 338 to enter one of the holes 350 and by this means positively locking the totalizer unit in its set position. In order to support the totalizer unit at other points than the rollers 335 (Figs. 16 and 17) the rigid plate 355 has a laterally extending part 3551 slotted to receive a roller on rod 338 and the side frame 313 of the machine is provided with a bracket 3131 having a laterally extending arm passing through a slot in plate 333.

Printing mechanism.

The printing mechanism is shown in Fig. 23 and it was previously explained how the sleeves 288 which support the type wheels 289 are differentially rotated through pinions 287 on the sleeves and segment gears 286 fast to sleeves 285. The connection of the latter with the differential mechanism is shown in Fig. 7. The detail strip, indicated by numeral 400, passes from a supply roller 401 to a receiving roller 402 provided with a ratchet which is operated one space by a pawl or pitman 403 previous to each impression whether relating to an item subtotal or total. The pitman 403 carries a roller which is operated upon by a projection on the periphery of a cam disk 405 to operate the pitman. A type hammer is indicated by numeral 404 and is operated by the cam 405 fast to rotation shaft 6. Means are provided for the insertion of operators' identifying keys 406 so that each printed amount may be identified with the operator who entered it.

Operation.

*Entering an item.*—Items are entered in the main totalizer and also in one of the department totalizers according to a predetermined classification of the item. The amount of each item is also printed on the detail strip. To effect such operations the proper value keys and one department key are depressed. The release and operation of the machine is effected upon a depression of the department key. Consequently it is necessary first to depress value keys. The depression of the latter has the immediate effect of positioning the shanks of the keys into operative relation with the arms 250 (Fig. 7) of the differential mechanism and withdrawing the zero stops 124 from the path of the latches 243 by causing the detents 113 to move downwardly and thereby rock arms 116 into engagement with pins 123 on the zero stops. Depression of a department key 101 (Fig. 12) causes an upward movement of detent plate 134 thereby permitting rod 139 to spring upwardly to the front of shoulder 138 on the plate and retain the plate in its moved position and thus lock the key depressed. The upward movement of rod 139 by engagement with the extensions 131 (Fig. 8) on the supporting arms for the locking plates 114 for the value keys causes these detents to move upwardly and lock depressed keys in such position and prevent manipulation of undepressed keys. The rocking movement of shaft 63 which supports the rod 139 is effected by spring 61, (Fig. 18) extended between the arm 62 fast on the shaft and plate 59. Such movement of the shaft through the plate 62 forces link 65 and the member 67 downwardly thereby rocking plate 59 from the position in which it is shown in Fig. 2 to its position shown in Fig. 18. Pawl 57 is thus released and shaft 54 rocked, carrying the locking pawl 53 away from disk 10 on drive shaft 11 (Fig. 3). Crank 1 (Fig. 2) may then be twice rotated and through the train of gears shown in this figure and Fig. 3 cause the required single rotation of drive shafts 11 and 6.

The rotation of the drive shafts first through cams 12 and 13 (Fig. 7) and connections to segments 21 rocks all of the segments upwardly including one for each bank of value keys and one for the bank of department keys. This movement of the segments 21 carries latches 243 upwardly until the arms 250 of the supporting arms 246 engage either the zero stop projections 126 or depressed value keys, or in respect to the latch for the department keys one of the department keys. The upward movement of the latches causes a corresponding upward movement of the differential members 205 of the value banks and the member 3461 of the bank of department keys. The members 205 when moving from their normal position to zero position serve in closing the gap between the racks 206 and 207 and the transfer teeth 208 and 209 latching the same to the members 205 through the arms 213 and recesses 2151 in shoulders 215. Such of the members 205 as are not stopped in zero positions then continue to move differentially carrying more or less of the teeth on racks 206 and 207 into position to operate the totalizers on their return movement.

During the setting movement of the members 205 the multiple totalizer unit (Fig. 12) is shifted by the action of cam 241. The segment 21 for the department totalizer differential mechanism carries the forward end of the member 3461 more or less upwardly under the control of the depressed department key. Then the roller 290 on the lever 16 for the department bank engages the beam 345 to move the rear end of the beam to the position corresponding to that of the member if the beam is not rotated to such position. As the beam is connected to the cam 341 by the pin 344 the cam is adjusted to the position corresponding to the key depressed.

The adjustment of the beam 345 (Fig. 12) controlled by the differential mechanism of the department keys and of beams 280 (Fig. 7) controlled by the differential mechanism of the value keys through link connections to the type carriers serve to set the latter. The impression on the detail strip may be taken at any time after the adjustment of the type carriers as they are not returned until the next operation of the machine.

The main totalizer and the selected department totalizer are engaged with the actuators 206 and 207 by the totalizer engaging mechanism shown in Fig. 4 while the actuators are at rest in their moved positions. Shaft 29 (Fig. 5) is rocked by cams 24 and 25 on drive shaft 6 thereby first carrying plates 33 downwardly and through levers 41 and 42 rocking arms 320 and 351 and thus causing rollers 322 and 353 on the latter to engage cam slots 3001 and 3002 (Figs. 15 and 17) in the fixed plates 309 and 354. Shafts 305 and 336 are thereby drawn toward the actuators 206 and 207 and carry the respective totalizers which they support into engagement with the actuators. The totalizers remain in engagement while the differential members 205 are restored to normal position by engagement of the segments 21 (Fig. 7) with pins 2051 on the members 205 and the member 3461 (Fig. 12). The totalizer pinions are thereby rotated as required for adding the item.

During this time more or less of the transfer pawls 227 (Fig. 11) may have been tripped thus permitting the corresponding plates 218 to rock downwardly carrying their shoulders 217 out of the path of the pins 216 on arms 210 and their shoulders 226 into the path of these arms. By this means some of the arms 210 may not be disengaged from the members 205 and stopped in normal position as shown in Fig. 6, but permitted to rotate a single tooth space beyond the normal position and thereby effect transfers. After the differential mechanism is at rest the totalizers are disengaged by return movement of plates 33 (Fig. 4) under the action of the lever 30 fast to shaft 29.

The transfer devices which are displaced during an adding operation are restored to normal position on the forward stroke of the differential mechanism in the succeeding operation of the machine. For this purpose the shoulders 2003 (Fig. 7) on segments 21 engage pins 2002 (Fig. 11) on three armed levers 2001 when the segments reach the end of their rearward stroke and movement of the three armed levers 2001 is thereby effected causing their ends to engage shoulders 2004 on the displaced transfer plates 218, rocking them upward to the position shown in Fig. 11. The transfer pawls 227 are then permitted to resume operative positions under the action of their springs 228. The plates are now in such position that their shoulders 217 will engage the pins 216 at the end of the return stroke of the differential mechanism provided the plates are not during the return stroke displaced from normal position by operation of one of the transfer pawls.

*Printing a total from the main totalizer.—*
In this operation the main total key 152 is depressed as shown in Fig. 18, thereby through the arm 157 fast on shaft 151 causing arm 150 also fast on the shaft (Fig. 12) to engage pin 149 on the extension 148 of the zero stop 146 for the bank of department keys rocking the zero stop into position to stop the department bank differential mechanism in zero position for the purpose of preventing movement of the department totalizer selecting mechanism. Pin 145 on the zero stop by engagement with detent 134 raises the latter to lock the department keys from depression and release the machine.

The act of depressing the main total key also through arm 1922 (Fig. 19) fast to shaft 151, rocks pawl 185 forwardly. Such movement of the pawl 185 through its engagement with the pin 187 on the pawl 188 (Fig. 4) pivoted to an arm 189 loose on shaft 179 rocks the arm to the position in which it is shown in Fig. 18. In this movement the rearward extension 1891 of arm 189 engages rod 181 on arms 180 fast to shaft 179 rocking the shaft clockwise a few degrees. By this means rod 181 (Fig. 8) is positioned in front of the extensions 182 on the supporting arms 116 for the detents 113 of the value keys preventing a movement of these detents and consequently depression of value keys. This slight movement of shaft 179 also through arm 1107 (Figs. 2 and 18) shifts the pitman 74 from the position in which it is shown in the former figure to the position shown in the latter figure. This movement of the pitman brings its roller 1001 into operative relation with one of the cams 1002.

The crank 1 (Fig. 2) is now given four rotations in place of the two required when items are entered. The first two rotations of crank 1 carry the driving mechanism through a complete operation and thereby causes the restoring of all transfer devices which were tripped on a preceding operation. As the zero stops of the differential mechanism during this time only prevent the actuators of the differential mechanism from moving beyond zero position the driving elements 21 move upward their usual extent from the position in which they are shown in the drawings and at the end of their upward movement their shoulders 2003 (Fig. 7) engage the pins 2002 (Fig. 11) on the arms 2001 causing them to engage and restore any of the tripped plates 218 and thereby permitting the transfer pawls 227 to resume normal position.

During the first part of the rotation of the drive shafts the totalizer engaging mechanism is entirely ineffective, as the depression of a total key causes both the plates 33 (Fig. 21) to be rocked to the inoperative or neutral positions as shown. The inward movement of a total key permits the operation of its respective latch 168, the pawl 198 pivoted on the total key being pushed aside by pin 169 on the latch which then drops in front of shoulder 170 on the key latching it in its depressed position. The plate 33 for the department totalizer is therefore held in the position in which it is shown in Fig. 21 until the total key is released which does not occur on total printing operations until after the completion of a second operation of the driving mechanism when the operator removes his finger from the key. Cams 24 and 25 (Fig. 5) are operative to rock shaft 29 so that rollers 31 and 46 first approach each other and at the same time and while rollers 31 and 46 are at rest in their moved positions cam 173 is operative to give the arm 164 a complete oscillation. When arm 164 arrives at its forward position the roller 163 engages in the recess 1647 in the forward end of the member 162 pivoted to the slide 159. Then upon the return movement of roller 163 the slide is carried rearward and engages the pin 177 on the plate 33 which controls the engagement of the main totalizer. This plate only is thereby rocked so that its hook end 178 is positioned below the roller 46 on the bell crank lever 47, while the remaining plate 33 for the department totalizers remains entirely inoperative leaving the department totalizers in unengaged position. The return movement of bell crank levers 30 and 47 thereafter through the roller 46 lowers the plate 33 for the main totalizer rocking the forked arm 42 (Fig. 4) to the right thereby causing the totalizer to be engaged with the actuators 206 just before the completion of one rotation of the drive shaft.

Just before the totalizer is meshed and before the differential mechanism is operated the second time to reversely turn the totalizer pinions to zero cam 1002 (Fig. 18) becomes effective to force pitman 74 still farther forward, thereby rocking shaft 179 farther clockwise and thus causing the rod 181 (Fig. 8) to engage the feet 127 of the zero stops 124 rocking the same out of the path of the value differential mechanism so that the latter is free to reset the totalizer. The same movement of pitman 74 positions plates 1004 (Fig. 18) so that the rollers 324 on arms 317 are engaged by the offset parts of the L slots in the plates. Therefore when plate 1004 operated by the engaging movement of the main totalizer moves upwardly it will carry with it the corresponding arm 317 thereby rocking shaft 319 and through it causing all of the forked arms 330 on this shaft to carry pins 331 forwardly and thus rock the pawls 242 into position to be engaged by the long teeth 301 of the totalizer pinions when the same are rotated to zero, or if some of the teeth 301 happen to be in zero position the movement of the corresponding pawls 242 is prevented and thereby movement of rollers 331 is communicated to arms 225 positioning them to stop their respective differential members 205 in zero position. Thus all the arms 225 that are not so positioned on the meshing movement of the totalizer are thus positioned when any of the long teeth 301 strike pawls 242. Engagement of pins 232 with any of the teeth 231 (Fig. 11) results in a slight relative movement between members 340 and their companion differential members 205 thereby operating the latches 243 to disengage the members 205 from their driving segments 21.

The counter-clockwise (Fig. 7) movement of segments 205 for reversely rotating the totalizer pinions does not occur until the beginning of the second cycle of operation of the driving mechanism of the machine, stopping mechanism (Figs. 2 and 3), for stopping the machine at the end of one complete rotation of the drive shafts being made inoperative on the forward movement of pitman 74. While the totalizer is being reset by the counter-clockwise (Fig. 7) movement of the members 205 at the second operation of the driving mechanism the type carriers are set according to the movement of said members in the same manner as when items are entered and an impression is therefore subsequently taken of the total which had been accumulated by the totalizer. The depressed total key 152 which is held depressed throughout the operation of printing a total holds by its flange 158, pawl 45 (Fig. 21) in operative relation with roller 46. Therefore on the second upward movement of roller 46 occurring after the actuators have returned the engaged totalizer pinions to zero on the counter-clockwise (Fig. 7) stroke of the actuators at the second operation of the mechanism the main totalizer plate 33 will be restored to normal position disengaging the totalizer from its actuators after the same have reset the totalizer to zero.

This disengagement of the main totalizer takes place during the second operation of the driving mechanism at the same time that the totalizer is engaged with the actuators during a single operation when an item is entered. While the levers 30 and 47 are being rocked finally to normal position, the shoulder 178 on the plate 33 for the main totalizer is not in operative relation with respect to the roller 46 as the plate 33 is rocked clockwise (Fig. 21) to its neutral position by its spring 51 when the slide 159 is restored to normal position by its spring 166 which occurs before this final movement of the levers 30 and 47 is begun. In this connection it may be pointed out that on total printing operations arm 164 makes two complete oscillations, the second half on the first oscillation being employed to carry slide 159 toward the lever 47. This movement of the slide by pin 196 engaging extension 192 of the total key retaining pawl 168 restores the pawl to normal position thus returning pin 167 into the path of shoulder 171 on pawl 162. Therefore on the second forward movement of arm 164 which does not occur however until after the actuators have been moved to return the engaged totalizer pinions to zero the pawl and slide 159 follow under the action of their spring 166 until shoulder 171 engages pin 167 when pawl 162 is thus disengaged from roller 163 and the slide 159 is in foremost position. The next return oscillation of arm 164 is idle. It will thus be seen that slide 159 is in a rearward position long enough to make the selected plate 33 operative with respect to roller 46 only on the first of the downward movements of the latter. When the operator finally removes his finger from the total key the plates 33 are permitted to rock to normal position and carry their recesses 32 over the roller 31.

*Printing a subtotal from the main totalizer.*—This operation is somewhat similar to a total printing operation from the main totalizer with the exception that the total key 152 is not manually retained depressed but is permitted to return to normal position under the action of its spring 1521 as soon as its latch 168 is restored to normal position on the movement of slide 159 toward the lever 47. This occurs just after the rollers 31 and 46 have approached each other during the first operation of the driving mechanism. When the slide 159 moves rearwardly at such time its flange 199 engages the plates 33 holding the same in the position to which they had been moved by the depression of the total key. The release of the key however permits the pawl 45 hung from the pivot 34 on plate 33 for the main totalizer to rock to an inoperative position. Therefore on the second approaching movement of the bell crank levers 30 and 47 the main totalizer is permitted to remain in mesh with the actuators, the rollers 31 and 46 approaching each other idly. In this operation when roller 31 arrives for the first time at home position opposite notch 32 in the unemployed plate 33 this plate is prevented from rocking into engagement with the roller by flange 199 on the slide 159. This flange, when the slide is in the inner position, is in the same vertical plane as the flange 158 of the total key when the latter is in its rear position and permits the same function with respect to unemployed plate 33 as the flange 158 does. After the totalizer pinions have been rotated to zero the bell cranks 30 and 47 are again rocked so that the rollers 31 and 46 approach each other. During this movement of the roller 31 the slide 159 is being moved forward to its normal position by its spring 166 and the corresponding plate 33 which is in its lowered position is rocked about its pivot by its spring so that its recess 32 engages the roller 31 when the roller reaches its lower position. Therefore when the rollers 31 and 46 are again separated to return to normal position shown in Fig. 21 of the drawings, the main totalizer plate 33 is restored to its upper position by the roller 31. Consequently the main totalizer is disengaged after having remained in mesh long enough to be rotated both rearwardly and again forwardly upon the forward and return movement of its actuators. When roller 31 finally moves upwardly it engages the rear edge of the unemployed plate 33 and when the roller arrives in its upper position this plate rocks into engagement so that both plates are engaged, the mechanism being thus restored to normal ready for the entry of an item as shown in Fig. 3.

In both total and subtotal printing operations the type carriers remain set the same as when items are entered during all of the operation of the machine after the forward movement of the differential mechanism. Thus the impression mechanism operates at the same time and in the same manner as in all of these operations.

*Printing a total from a department totalizer.*—For this operation it is necessary to select one of the department totalizers and consequently to depress one of the department keys (Fig. 12). The department total key 153 for this reason is not provided with means for releasing the machine, the department keys accomplishing this end. The depression of a department total key 153 causes the operation of its respective latch 168 and therefore selects for operation the slide 160 (Figs. 19 and 20.) This slide is adapted to engage the pin 177 on the plate 33, having connections through the lever 41 to the department totalizer engaging mechanism.

Upon the rotation of the crank handle 1 the first operation of the driving mechanism serves differentially to slide the department totalizer unit laterally as required to select one of the totalizers and as determined by the differential mechanism of the department bank as shown in Fig. 12 and which controls the differential operation of cam 341. This mechanism is operative to reposition the department totalizers on succeeding operations of the machine provided the same totalizer is not successively selected, but it never returns the department totalizers to any normal position. Therefore on a total printing operation to print a total from any one of these totalizers the unit on the first operation of the driving mechanism is slid laterally to select the desired totalizer and remains in this position during the second operation of the driving mechanism as its positioning devices do not effect its setting.

The selected department totalizer is not engaged with the differential actuators until the driving mechanism has about completed its first operation. The selected totalizer is engaged when the roller 46 is lowered the first time as the roller then engages the projection 178 on the plate 33 for the department totalizers. This occurs at the same time that the totalizer is disengaged during an item entering operation. Then the department totalizer remains in engagement until the counter-clockwise movement (Fig. 7) of the actuators is completed. Then the department totalizer remains in engagement during the forward movement of the actuators at which time the rollers 30 and 46 after having been made to once approach and recede from each other (Fig. 4) and are still in their separated positions with the department totalizer plate 33 held in its lower position by the roller 46. After the totalizer is reset rollers 31 and 46 again approach each other and the latter through the pawl 45 which is held in rearmost position by the operator retaining the department total key depressed returns the selected plate 33 to the position to which it was adjusted when the total key was depressed. In this way the selected department totalizer is disengaged. At about this time the slide 160 is allowed by arm 164 to return to normal position under tension of its spring 166 and therefore the shoulder 178 of the selected plate 33 becomes inoperative with respect to roller 46 so that on the final restoring movement of the bell cranks 30 and 47 they do not affect the plates 33 but allow them to remain in their upper positions. Finally upon release of the depressed total key by the operator both plates 33 under the action of their springs 51 reëngage the roller 31 on bell crank lever 30 as both the department total key and the slide 160 no longer prevent such movement, and the machine is ready to be again operated. In this operation the department totalizer key is held depressed throughout the operation of the machine.

*Printing a subtotal from a department totalizer.*—In this operation the department total key 153 is depressed but is not held in its depressed position during the entire operation of the machine, that is, during two full operations of its driving mechanism.

The department totalizer is selected and the machine is released for operation as pointed out in the description of the operation when a total is printed from one of the department totalizers. The depression of the department total key disconnects both of plates 33 from the roller 31 and then when rollers 31 and 46 first approach each other their movement is idle. While this is occurring and the bell cranks 30 and 47 are at rest in their moved positions the department totalizer is selected and the slide 160 is moved rearwardly by the pin 163 on the arm 164 engaging the recess 1647 in the pawl 162 on the slide. When the slide 160 moves rearwardly it engages the pin 177 on the plate 33 for the department totalizer thereby moving the shoulder 178 and the plate beneath the roller 46. The rearward movement of slide 160 also serves to release the depressed department key. After the department totalizer key is released and on the first restoring movement of bell cranks 30 and 47 the selected plate 33 is moved downwardly by pin 46 on the latter bell crank thereby causing the selected department totalizer to be engaged with the actuators. The unemployed plate 33 is held in inoperative position by the flange 199 on the slide 160. When roller 31 arrives in its upper position the unemployed plate 33 still cannot rock into engagement with it as flange 199 on slide 160 prevents such rocking movement of the plate. While the bell crank levers are again at rest in their normal position the department totalizer is reset so that a subtotal may be printed. The bell crank levers 30 and 47 are again operated so that the rollers 31 and 46 approach each other but the department totalizer still remains in mesh as the pawl 45 was permitted to rock to an inoperative position on the release of a department total key. When the roller 31 is at rest in its lower position the differential mechanism is again restored returning the total amount to the department totalizer so that it stands at its former setting. The plate 33 for the department totalizers by its spring 51 reëngages roller 31 at the notch 32. Then on the final restoring movement of bell crank levers 30 and 47 the plate 33 is returned by the former to normal position thus disengaging the department totalizer. The remaining plate then rocks into engagement with the roller 31 and the operation is complete.

From the foregoing description it will be seen that the present invention provides many novel mechanisms applicable to many different styles of accounting machines.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a machine of the class described, the combination with an accounting device, of a differentially movable accounting device actuator, a type carrier having connections therewith, and operative by movement of said actuator, and means for positively driving the actuator and thereby the accounting device under control of the accounting device.

2. In a machine of the class described, the combination with an accounting device, of mechanism constructed to differentially operate said accounting device forwardly or backwardly as desired, a latch carried by said mechanism and coöperating with a member having a substantially constant movement, and keys controlling said latch whereby the latch may be disconnected from said member when said mechanism has operated a desired extent.

3. In a machine of the class described, the combination with an accounting device, of a member having an invariable movement on operations of the machine, an actuator for the accounting device, a latch for connecting the actuator with the said member, manipulative means for controlling said latch and connections whereby the accounting device may control the operation of said latch independently of said manipulative means.

4. In a machine of the class described, the combination with a totalizing device, of a type carrier, a member having an invariable movement on operations of the machine, an actuator for the type carrier, a latch for connecting the actuator with said member, manipulative means for controlling said latch and connections whereby operation of the latch is controlled by the totalizing device independently of said manipulative means.

5. In a machine of the class described, the combination of an accounting device, a differentially movable actuator therefor, mechanism operated by movement of the accounting device constructed to regulate the movement of the actuator, and means for positively driving the actuator differentially as controlled by said mechanism.

6. In a machine of the class described, the combination of an accounting device, mechanism constructed to differentially operate said accounting device forwardly or backwardly, a latch carried by said mechanism, a driving member having a substantially constant movement adapted to coöperate with the latch to drive said mechanism, manipulative means controlling the latch whereby the latter disconnects the driving member and differentially movable mechanism, and a second manipulative means for disabling the control of the latch from the keys and adapted to render the former controllable by the accounting device.

7. In a machine of the class described, the combination of a plurality of totalizers, a common set of actuators adapted to simultaneously operate the totalizers, means for positively driving the actuators differentially to add simultaneously on a plurality of totalizers, manipulative means for controlling the differential movement of the actuators, mechanism whereby the totalizers may control the positive movement of the actuators, and means for selecting the totalizer for so controlling the movement of said actuators, said means adapted to render the control of the actuators from the manipulative means ineffective and to prevent simultaneous actuation of a plurality of totalizers.

8. In a machine of the class described, the combination of an accounting device, a differentially movable member adapted to be moved positively and differentially, a type carrier having connections with said differentially movable member, mechanism for regulating the movement of the differentially movable member, means for projecting a part of said mechanism into operative relation with the accounting device, and means whereby rotation of the accounting device to zero position operates said mechanism to control the extent of movement of the differentially movable member and the setting of the type carrier connected therewith.

9. In a machine of the class described, the combination of an accounting device, a differentially movable member operatively connected with the accounting device, a type carrier operatively connected with the differentially movable member, manipulative means for controlling the movement of the differentially movable member, means for positively setting said last mentioned member in accordance with the manipulation of the manipulative means, and means whereby the differentially movable member may be positively adjusted when desired under the control of the accounting device, said last mentioned means being operated during operation of the setting means in which the accounting device controls the actuator.

10. In a machine of the class described, the combination of totalizer element, a differentially movable member, a type carrier operatively connected with said member, manipulative means, means for positively driving the differentially movable member in accordance with the manipulation of the manipulative means, and connections whereby the totalizer element independently of said manipulative means may control the positive movement of the differentially movable member by its driving means.

11. In a machine of the class described, the combination of a totalizer element, a type carrier, an actuator for setting the type carrier and the totalizer element, manipulative means for controlling said actuator, means for driving the actuator, and connections whereby the totalizer element independently of said manipulative means renders the driving means ineffective upon the actuator.

12. In a machine of the class described, the combination of a totalizer element, a type carrier, an actuator adapted to connect said element and type carrier, manipulative means for controlling said actuator, driving means for the actuator, and means controlled by the totalizer element independently of said manipulative means for rendering the driving means ineffective upon the actuator.

13. In a machine of the class described, the combination of a totalizer element, a type carrier, an actuator adapted to connect said totalizer element and type carrier, a driving member for the actuator, a latch for connecting the actuator and driving member, manipulative means for controlling said latch, and means whereby operation of the latch is controlled by the totalizing element independently of said manipulative means.

14. In a machine of the class described, the combination of a totalizer element, a type carrier, an actuator for operatively connecting the totalizer element with the type carrier, a driving member for the actuator, a latch for connecting the actuator with said driving member, an arm adapted to be positioned into the path of movement of the totalizer element and to be moved by said element when it reaches zero position, and means operated by the movement of the arm by the totalizer element to operate the latch to disconnect the driving member and actuator.

15. In a machine of the class described, the combination of a totalizer element, a type carrier, an actuator operatively connected with the type carrier, a driving member for the actuator, a member carried by the actuator between which and the actuator a slight movement is permitted, connections whereby relative movement between the actuator and the member carried by it serves to render the driving means for the actuator ineffective, means for connecting the totalizer element with the actuator for movement by the latter toward zero position, and means operated by the totalizer element when reaching zero position for preventing movement of the member carried by the actuator but adapted to permit slight further movement of the actuator relative to the member carried by it to render the driving means for the actuator ineffective to further drive the latter.

16. In a machine of the class described, the combination of an accounting device, an actuator adapted to rotate the accounting device reversely toward zero position, driving means for the actuator, and controlled by said accounting device means for disengaging the driving means from its actuator when the accounting device reaches zero position.

17. In a machine of the class described, the combination of a totalizer element, an actuator therefor, driving means for the actuator adapted to rotate the totalizer element toward zero position, an arm adapted to be positioned in the path of movement of the totalizer element and moved thereby when said element reaches zero position, and connections whereby the movement of the arm by the totalizer element disconnects the driving member from its actuator.

18. In a machine of the class described, the combination with a totalizer element, an actuator therefor, driving means for the actuator adapted to rotate the totalizer element toward zero position, an arm adapted to be positioned in the path of movement of the totalizer element and moved thereby when said element reaches zero position, and connections whereby the movement of the arm by the totalizer elements disconnects the driving member from its actuator and positively stops the actuator from further movement.

19. In a machine of the class described, the combination of a totalizer element, an oscillatory actuator therefor, driving means for the actuator, a member carried by the actuator having limited movement relative thereto, means whereby movement of said member relative to its actuator renders the driving means ineffective to drive the actuator, and means movable by the totalizer elements to engage the member carried by the actuator and prevent its movement, a slight additional movement of said actuator relative to said member carried by it serving to render the driving means ineffective upon the actuator.

20. In a machine of the class described, the combination of an accounting device, a member having an invariable movement on operation of the machine, an actuator for the accounting device, a latch for connecting the actuator with said member, and connections including elements adapted to be positioned into the path of movement of the accounting mechanism and of the actuator whereby the former controls the extent of movement of the latter, said connections operative to effect disengagement of the actuator with the invariable movable member when the actuator is stopped under the control of the accounting device.

21. In a machine of the class described, the combination of an accounting device, a member having an invariable movement on operations of the machine, an actuator for the accounting device, a latch for connecting the actuator with said member, a second member slidably carried by the actuator having a limited movement relative thereto, connections between said second member and the latch whereby movement of the actuator relative to said second member operates to disconnect the actuator and invariable movable member, and means whereby the accounting device serves to cause relative movement between the actuator and its member carried thereby, thus controlling the disengagement of the actuator and the invariable movement member, said means serving to differentially limit the movement of the actuator.

22. In a machine of the class described, the combination of an accounting device, a member having an invariable movement on operations of the machine, an actuator for the accounting device, a latch for connecting the actuator with said member, manipulative means for controlling said latch and means whereby the latch may be controlled by the accounting device to disconnect the actuator and member having means for positively limiting the movements of the actuator.

23. In a machine of the class described, the combination of an accounting device, a member having an invariable movement on operations of the machine, an actuator for the accounting device, a latch for connecting the actuator with said member, projections carried by the actuator and connections whereby the accounting device may control the disengaging of the actuator and member and adapted to engage the projections to positively limit the movement of the actuators.

24. In a machine of the class described, the combination of an accounting device, a member having an invariable movement on operations of the machine, an actuator for the accounting device, means for connecting the actuator with said member, through which the latter drives the former, a movable stop for the actuator and connections whereby the accounting device positions the stop to limit the movement of the actuator and permit further movement of said member independent of the actuator.

25. In a machine of the class described, the combination of an accounting device, a member having an invariable movement on operations of the machine, an actuator for the accounting device, a latch for connecting the actuator with said member, a second member slidably carried by the actuator having a limited movement relative thereto, connections between said second member and the latch whereby movement of the actuator relative to said second member operates to disconnect the actuator and invariable movable member, an arm adapted to be brought into coöperative relationship with the accounting mechanism and to be controlled by the latter in total taking operations, and means controlled by the arm and therethrough by the accounting mechanism for differentially limiting the movement of the second member and therethrough the actuator.

26. In a machine of the class described, the combination of an accounting device, a member having an invariable movement on operations of the machine, an actuator for the accounting device, a latch for connecting the actuator with said member, means for engaging the accounting device with the actuator to be reversely rotated by the latter, and connections whereby the accounting device when reaching zero position operates the latch to disengage the actuator from the invariably movable member.

27. In a machine of the class described, the combination with a totalizer element, an actuator for engaging and operating the same, means for driving the actuator differentially to actuate the totalizer element, means whereby the actuator may be caused to rotate the totalizer in the reverse direction and connections for disabling the driving means for the actuator when the totalizer element reaches zero position.

28. In a machine of the class described, the combination with an accounting device, of a differentially movable member and a type carrier having connections therewith, mechanism for regulating the movement of said differentially movable member, means for projecting a part of said mechanism into operative relation with the accounting mechanism, and means for operating the differential member and thereby causing the accounting device to operate said mechanism.

29. In a machine of the class described, the combination with an accounting device, of a differentially movable member and a type carrier having connections therewith, and mechanism for regulating the movement of said differentially movable member, said accounting device through reverse rotation of its elements being constructed to control said mechanism.

30. In a machine of the class described, the combination with an accounting device, of a differentially movable member and a type carrier having connections therewith, mechanism under the control of the accounting device and operative by reverse movement of the elements of the latter for regulating the movement of said differential member, and means for driving said differential member.

31. In a machine of the class described, the combination with a series of accounting devices, of operating mechanism for the accounting devices, mechanism for selecting accounting devices for operation, total printing mechanism and devices having connections for controlling both the selecting mechanism and the printing mechanism.

32. In a machine of the class described, the combination with an accounting device, of an actuator therefor, mechanism for driving the actuator, mechanism for engaging the accounting device with the actuator, and a manipulative device for controlling said engaging mechanism and the extent of operation of the driving mechanism.

33. In a machine of the class described, the combination with an accounting device, of an actuator therefor, means for operating the actuator, mechanism for engaging the accounting device with the actuator, and a manipulative device having connections for causing two consecutive operations of said actuator to one operation of the manipulative device and for rendering said engaging mechanism operative but once during the two consecutive operations.

34. In a machine of the class described, the combination with an accounting device, of an actuator therefor, means for operating the actuator, mechanism for normally engaging and disengaging the accounting device with the actuator during one operation of the actuator, and a manipulative device capable of rendering said mechanism operative to engage and disengage the totalizer but once during two operations of the actuator.

35. In a machine of the class described, the combination of actuating mechanism, a totalizer, a lever adapted to be oscillated at each operation of the machine, connections between the lever and the totalizer to engage and subsequently disengage the latter from the totalizer, a manipulative device adapted when depressed to permit a plurality of operations of the operating mechanism, and a mechanism oscillated with the lever whereby when the manipulative device is depressed, said lever and mechanism operate to engage the totalizer with the actuating mechanism at one operation of the machine and to disengage the totalizer and actuating mechanism on a succeeding operation of the machine.

36. In a machine of the class described, the combination of a totalizer, actuating mechanism therefor, printing mechanism controlled by the actuating mechanism, means normally engaging the totalizer with the actuating mechanism and subsequently disengaging said totalizer therefrom at an operation of the machine in which items are entered on the totalizer, manipulative means, connections whereby said means when manipulated serve to alter the ordinary or the usual totalizer engaging mechanism and render it effective to engage the totalizer with the actuating mechanism at the time of the usual disengaging operation between these members, said manipulative means and connections serving to effect disengagement of the totalizer and actuating mechanism at a succeeding operation of the machine.

37. In a machine of the class described, the combination of a totalizer, actuating mechanism therefor, a lever and connections for engaging and disengaging the totalizer from the actuating mechanism at an item entering operation of the machine, the second lever connected with the first mentioned lever and movable by the former always in the opposite direction, and a manipulative means adapted to render the first mentioned lever ineffective to engage the totalizer with the actuating mechanism and the latter lever effective for such purpose.

38. In a machine of the class described, the combination of a totalizer, operating mechanism therefor, means for controlling the operating mechanism to enter items into the totalizer in one complete operation of the operating mechanism, printing mechanism, means whereby the printing mechanism may be controlled by the accounting mechanism to print a total from the latter, and means for compelling two complete operations of the operating mechanism for a complete total taking operation.

39. In a machine of the class described, the combination of operating mechanism, a totalizer, means for engaging and disengaging the totalizer with the operating mechanism at one complete operation of the latter when items are to be entered in the totalizer, printing mechanism, connections whereby the printing mechanism may be controlled by the totalizer to print a total standing on the latter, and manipulative means for controlling the total taking operations, said means adapted to disable the means for engaging and disengaging the totalizer with the operating mechanism at a single operation of the latter and to render operative mechanism for rendering the totalizer engaging and disengaging mechanism operative during one operation of the operating mechanism to engage the totalizer with the latter and at a succeeding operation of the operating mechanism to disengage the totalizer therefrom.

40. In a machine of the class described, the combination of an accounting device, an actuator therefor, means for operating the actuator, mechanism for engaging the accounting device with the actuator, a manipulative device having connections for causing two consecutive operations of the actuator to one operation of the manipulative device, and means whereby upon the operation of the manipulative device the accounting device is engaged with the actuators on one operation of the machine and disengaged therefrom upon the next operation.

41. In a machine of the class described, the combination of a plurality of accounting devices, an actuator therefor, means whereby said plurality of accounting devices are adapted to be simultaneously operated by the actuator during a single operation of the machine to have items entered in said acounting devices, and manipulative means for selecting one of the accounting devices for a total taking operation therefrom, said means disturbing the regular controlling mechanism of the machine and adapted to effect two consecutive operations of the various mechanisms for the complete operation.

42. In a machine of the class described, the combination of a totalizer, actuating mechanism therefor adapted to enter items into said totalizer in one operation of the actuating mechanism, printing mechanism, connections whereby the printing mechanism may be controlled by the accounting mechanism to print a total from the latter, and manipulative means for controlling the total taking operations and to cause two complete operations of the actuating mechanism in a total taking operation.

43. In a machine of the class described, the combination of actuating mechanism, a totalizer normally disconnected from the actuating mechanism, and a manipulative device controlling the engagement and disengagement of the totalizer and actuating mechanism upon total taking operations of the machine, said manipulative device normally serving to effect the printing of a grand-total but adapted to effect the printing of a sub-total when held in manipulated position throughout the operation of the machine.

44. In a machine of the class described, the combination of accounting mechanism, keys for controlling the operation of said mechanism, springs suitably located to resist the depression of the keys, and means for supporting the springs independently of the keys.

45. In a machine of the class described, the combination with accounting mechanism, of differential mechanism, depressible keys for controlling the differential mechanism, springs suitably located to resist depression of keys, and a mount for said springs to support them independently of the keys.

46. In a machine of the class described, the combination with an accounting device, of mechanism for operating the accounting device, a shaft supporting the accounting device, a member on said shaft, a cam for coöperating with said member, and means for turning said shaft and thereby causing the said member to engage said cam and as a result move the accounting device relatively of the operative mechanism.

47. In a machine of the class described, the combination with an accounting device comprising a plurality of pinions journaled in a movable frame, of actuating racks, means for moving the frame to engage and disengage the pinions from the racks, pinion alining and locking devices pivoted on said frame, and means operated by a fixed member on movement of the frame for rocking the alining devices.

48. In a machine of the class described, the combination with an accounting device, of an actuator therefor, a slidably mounted frame for supporting the accounting device, a rock shaft journaled in said frame, an arm secured to said rock shaft, a fixed cam, and means for rocking the rock shaft and thereby cause the arm to engage the cam and thus move the accounting device into and out of engagement with the actuator.

49. In a machine of the class described, the combination with an accounting device actuating mechanism, of a plurality of accounting devices arranged in a unit differentially movable with respect to the actuating devices, a cam for differentially positioning the accounting device unit, means for moving the accounting device unit to bring an accounting device into and out of engagement with the actuators, holes in said cam, and a coöperating member on said accounting device unit adapted to enter one of said holes on the engaging movement of said accounting device unit.

50. In a machine of the class described, the combination with a plurality of accounting devices arranged in a movably mounted unit, actuating mechanism for the accounting devices, a cam for differentially positioning the accounting device unit with respect to the actuators, a plurality of holes in the cam, and a device on the accounting device unit coöperating with said cam and adapted to enter said holes.

51. In a machine of the class described, the combination with a plurality of accounting devices arranged in a movably mounted unit, actuating mechanism for the accounting devices, a cam for differentially positioning the accounting device unit with respect to the actuators, and a coöperating device for said cam mounted on said accounting device unit and adapted to interlock with said cam after a differential positioning of said accounting device unit.

52. In a machine of the class described, the combination of actuating mechanism, a plurality of accounting devices arranged in a unit, a cam for differentially positioning the accounting device unit to bring the desired accounting device in operative alinement with the actuating mechanism, means for moving the alined accounting device to carry it into and out of engagement with the actuators, and a member on the accounting mechanism unit adapted to be brought into engagement with the cam when the accounting device is moved into engagement with the actuators to prevent movement of the accounting device unit relative to the cam while the selected accounting device is in engagement with the actuating mechanism.

53. In a machine of the class described, the combination of a plurality of totalizers, actuating mechanism therefor, a cam for selecting the totalizer to be actuated, means for engaging the selected totalizer with the actuating mechanism, and connections whereby movement of the cam is prevented by the totalizer mechanism when one of the totalizers is engaged with its actuating mechanism.

54. In a machine of the class described, the combination of a plurality of totalizers, a laterally shiftable frame carrying said totalizers, actuators with which the totalizers are selectively brought into operative alinement when the totalizer frame is laterally shifted, a cam for laterally shifting the totalizer frame, means for moving the totalizer frame toward the actuators to engage the alined totalizer with the actuator, and connections between the cam and frame whereby the frame is prevented from movement in the direction of the planes of the actuators when the selected totalizer is engaged with them.

55. In a machine of the class described, the combination with a totalizer, of a totalizer actuating rack, a second rack mounted in alinement with said first mentioned rack and movable therewith, means for differentially actuating the racks, a latch normally connecting the racks, means for operating said latch and stopping one of said racks before the other rack reaches the end of its stroke, and a transfer device for disabling said means for stopping one of the racks.

56. In a machine of the class described, the combination with a totalizer, of a totalizer actuating rack consisting of two sections, positive means connecting the two sections, means for differentially actuating the rack, positive means for disconnecting the two sections and stopping one of them before the other reaches the limit of its stroke, and means controlled by the totalizer for disabling said means for disconnecting and stopping one of the sections.

57. In a machine of the class described, the combination with a plurality of totalizers, of a main actuator provided with a rack portion consisting of two sections for each totalizer, positive means normally connecting the two sections, means for disconnecting the two sections and stopping one of them before the other section reaches the end of its stroke, and means controlled by each totalizer for disabling said means for disconnecting the sections of the racks and stopping one of them.

58. In a machine of the class described, the combination with a plurality of totalizers, of an actuator provided with a main rack and an auxiliary rack for each totalizer, means for differentially actuating the racks, positive means normally connecting the main and auxiliary racks, means normally disabling the connecting means and stopping one of the racks before the other reaches the end of its stroke, and transfer devices for disabling the disconnecting and stopping means, thereby increasing the effective length of the rack, when it is desired to effect a transfer.

59. In a machine of the class described, the combination with a totalizer, of an actuating rack therefor, said rack consisting of two sections having a certain extent of movement relative to each other, means for causing a relative movement between the actuating rack and the totalizer, and transfer devices operating to positively connect the two sections of the rack to increase the effective length of the rack when it is desired to effect a transfer.

60. In a machine of the class described, the combination with a plurality of totalizers each comprising a plurality of movable elements, of a single set of main actuators for the elements of all of the totalizers, auxiliary actuators movable with the main actuators but normally being retarded the last unit of movement at the end of the stroke of the main actuators, and means for positively connecting the main and auxiliary actuators to prevent said independent movement when a transfer between the elements of the totalizers is to be made.

61. In a machine of the class described, the combination with a totalizer comprising a plurality of movable elements, movable actuators therefor each composed of a plurality of relatively movable parts, means operatively and positively connecting the movable parts to cause them to move together, and means controlled by the totalizer elements for rendering the first mentioned means ineffective and preventing the movement of parts of the actuators during a portion of the movement of said actuators.

62. In an accounting machine, the combination with a plurality of totalizers, of a main actuator provided with a rack portion for each totalizer, means causing relative movement between the main actuator and the totalizer, and positive means controlled by each totalizer for varying the number of teeth in the effective portion of its corresponding rack portion.

63. In a machine of the class described, the combination with a totalizer element, of a main actuator and an auxiliary actuator therefor, and means for positively connecting the main and auxiliary actuators, said connecting means being controlled as to its effectivity by the totalizer element of next lower order.

64. In a machine of the class described, the combination with a plurality of totalizers, of actuators therefor, said actuators consisting of two sections, and means controlled by totalizer wheels of lower order for positively holding the two sections together when effecting a transfer from wheels of lower order to wheels of higher order.

65. In an accounting machine, the combination with a totalizer, of a variable length actuating rack therefor, means for causing relative movement between the actuating rack and the totalizer, and positive means controlled by the totalizer for varying the effective length of the actuating rack.

66. In a machine of the class described, the combination with a driving mechanism, of a totalizer, differentially movable actuators for said totalizer, manipulative means for controlling the actuators, type carriers operatively connected to the actuators, and means for positively and differentially driving the actuators independently of said manipulative means and under control of the totalizer by operation of the driving mechanism.

67. In a machine of the class described, the combination with a totalizer element, of an actuator constructed to operate said element both to add and to clear as desired, manipulative devices operable to control the actuator for adding, and a stop operated by the totalizer element to control the actuator in clearing.

68. In a machine of the class described, the combination with a totalizer element, of an actuator constructed to operate said element both to add and to clear as desired, a series of keys selectively operable to control the actuator for adding, and a stop operated by the totalizer element to control the actuator in clearing.

69. In a machine of the class described, the combination with a totalizer element, of an actuator constructed to operate said element in one direction to add and in the opposite direction to reset to zero, a set of stops selectively operable to control the actuator for adding, and an independent stop operated by the totalizer element to control the actuator differentially in resetting.

70. In a machine of the class described, the combination with a totalizer element, of an actuator therefor having an adding movement and a clearing movement, both of said movements being positive, manipulative devices, means whereby the manipulative devices control the adding movements, and means whereby the totalizer element differentially controls the clearing movement of the actuator.

71. In a machine of the class described, the combination with a totalizer element, of an actuator therefor having an adding movement and a clearing movement, both of said movements being positive, a type carrier operatively connected to the actuator, manipulative devices, means whereby the manipulative devices positively control the adding movements of the actuator, and means whereby the totalizer element positively and differentially controls the clearing movements of the actuator.

72. In a machine of the class described, the combination with a driving mechanism, of a totalizer, oscillatory actuators for operating the totalizer to add or to reset to zero, normally effective means positively connecting the actuators and the driving mechanism, keys selectively operable to disable said means during adding operations, and stops operated by the totalizer in resetting operations to disable said means.

73. In a machine of the class described, the combination with a totalizer, of actuators therefor, means for operating the actuators, a manipulative device having connections for causing two consecutive operations of the operating means to one operation of the manipulative device, and means controlled by the manipulative device for engaging the totalizer with the actuators during one operation and disengaging it at different points in the next operation.

74. In a machine of the class described, the combination with a totalizer, of actuators therefor, means for operating the actuators, a manipulative device having connections for causing two consecutive operations of the operating means to one operation of the manipulative device, and means controlled by the manipulative device for positively engaging the totalizer with the actuators during one operation and positively disengaging it at either of two points in the next operation.

75. In a machine of the class described, the combination with a totalizer, of means controlled thereby for printing grand totals and sub-totals, and a manipulative device controlling said means adjustable from a normal position to a second position and effective in said second position to cause printing either of grand totals or sub-totals as desired.

76. In a machine of the class described, the combination with an accounting device, of a differentially movable actuator therefor, manipulative means for controlling the actuator and means for positively driving said actuator to actuate said accounting device to an extent controlled by said device independently of said manipulative means.

77. In a machine of the class described, the combination of an accounting device, a differentially movable actuator therefor, means for positively driving the actuator differentially, manipulative means for controlling said actuator and mechanism controlled by the accounting device and constructed to regulate the movement of the actuator independently of said manipulative means.

78. In a machine of the class described, the combination with an accounting device, of a main operating mechanism, a member having an invariable movement on operations of the machine, an actuator for the accounting device, a latch for connecting the actuator with the said member, and connections whereby the accounting device may control the operation of said latch, said connections being operated during the operation of the main operating mechanism in which the latch is controlled by the accounting device.

79. In a machine of the class described, the combination with a totalizing device, of a main operating mechanism, a type carrier, a member having an invariable movement on operations of the machine, an actuator for the type carrier, a latch for connecting the actuator with said member, and connections whereby operation of the latch is controlled by the totalizing device, said connections being operated during the operation of the main operating mechanism in which the latch is controlled by the accounting device.

80. In a machine of the class described, the combination with an accounting device, of a differentially movable actuator therefor, mechanism including a single stop for the actuator, operated by movement of the accounting device and constructed to regulate the movement of the actuator, and means for positively driving the actuator differentially as controlled by said mechanism.

81. In a machine of the class described, the combination with a main operating mechanism, of a totalizer element, a differentially movable member, a type carrier operatively connected with said member, manipulative means, means for positively driving the differentially movable member in accordance with the manipulation of the manipulative means, and connections whereby the totalizer element may control the positive movement of the differentially movable member by its driving means, said connections being operated during the operation of the operating mechanism in which the totalizer element controls the movement of the differentially movable element.

82. In a machine of the class described, the combination with a totalizing element, of a type carrier, an actuator for setting the type carrier and the totalizer element, means for driving the actuator, and connections including a single stop for the actuator whereby the totalizer element renders the driving means ineffective upon the actuator.

83. In a machine of the class described, the combination with a main operating mechanism, of a totalizer element, a type carrier, an actuator for setting the type carrier and the totalizer element, means operated by the operating mechanism for driving the actuator, and connections whereby the totalizer element renders the driving means ineffective upon the actuator, said connections being operated during the operation of the operating mechanism in which the totalizer element controls movement of the actuator.

84. In a machine of the class described, the combination with a main operating mechanism, of a totalizer element, an actuator constructed to operate said element to add or clear the same, means operated by said totalizer element to control the actuator when the element is cleared, said means being normally in inoperative position when the element is operated to add, and a manipulative device for controlling movement by the operating mechanism of said means to operative position.

85. In a machine of the class described, the combination with a totalizer element, of a type carrier, an actuator for setting the type carrier and the totalizer element, a main operating mechanism for driving the actuator, normally ineffective connections operated by the totalizer element for rendering the driving means ineffective upon the actuator, and manipulative means for controlling movement by the operating mechanism of the connections to effective position when desired.

86. In a machine of the class described, the combination with a main operating mechanism, of a totalizer element, a type carrier, a member operated by the operating mechanism for driving the actuator, a latch connecting the actuator and the driving member, means, normally in inoperative position, operated by the totalizer element for controlling said latch, and a manipulative device for controlling movement of said means to operative position by the operating mechanism when desired.

87. In a machine of the class described, the combination with a main operating mechanism, of a totalizer element, a type carrier, an actuator for the totalizer element and the type carrier, a driving member for the actuator, a latch for connecting the actuator with the driving member, means adapted to be moved by the operating mechanism into the path of movement of the totalizer element and to be moved by said element when the latter reaches zero position, mechanism operated by said means to operate the latch, and a manipulative device for rendering said means movable by the operating mechanism when desired into the path of movement of the totalizer element.

88. In a machine of the class described, the combination with a main operating mechanism of a totalizer element, an actuator constructed to operate said element both to add and clear as desired, a stop and connections operated by the totalizer element to control the actuator in clearing said connections being normally in inoperative position, means operated by the operating mechanism to move the connections into position to be operated by the totalizer element when the latter is to be cleared, and a manipulative device for controlling said means.

89. In a machine of the class described, the combination with a main operating mechanism, of a totalizer element, an actuator constructed to operate said element both to add and clear as desired, a stop and connections operated by the totalizer element to control the actuator in clearing said connections being normally in inoperative position, means operated by the operating mechanism to move the connections, without moving said stop, into position to be operated by the totalizer element when the latter is to be cleared, and a manipulative device for controlling said means.

90. In a machine of the class described, the combination with a plurality of totalizers, of actuating mechanism constructed to add on and clear the totalizers, manipulative means for selecting the totalizer to be cleared, normally ineffective mechanisms, one for each totalizer, controlled by the totalizers to control the actuators when the totalizers are cleared, and means controlled by said manipulative means for selectively rendering effective the normally ineffective mechanism appropriate to the totalizer selected to be cleared.

91. In a machine of the class described, the combination with a main operating mechanism, of a plurality of totalizers, actuating mechanism constructed to add on and clear the totalizers, manipulative means for selecting the totalizer to be cleared, normally ineffective mechanisms, one for each totalizer, controlled by the totalizers to control the actuators when the totalizers are cleared, and means operated by the main operating mechanism and controlled by said manipulative means for selectively rendering effective the normally ineffective mechanism appropriate to the totalizer selected to be cleared.

92. In a machine of the class described, the combination with a plurality of totalizers, of actuators therefor, printing means for recording the items entered on the totalizers and the totals thereof, means for engaging the totalizers and actuators in item entering operations, manipulative means for controlling said engaging means selectively to engage any one of the totalizers with the actuators in a total printing operation, and normally ineffective mechanism, one for each totalizer, controlled by the totalizers in total printing operations to control the actuators, said manipulative means being constructed to selectively render the normally ineffective mechanism for the totalizer to be engaged with the actuators effective in a total printing operation.

93. In a machine of the class described, the combination with a main operating mechanism, of a totalizer, actuating mechanism for the totalizer, a normally effective locking device for the operating mechanism, printing mechanism, means whereby the printing mechanism may be controlled by the totalizer to print a total or subtotal from the latter, means for compelling two complete operations of the operating mechanism to print a total or subtotal, and a manipulative device for controlling said locking device and both of said means.

In testimony whereof I affix my signature in the presence of two witnesses.

WILLIAM A. CHRYST.

Witnesses:
R. C. GLASS,
CARL BEUST.

Copies of this patent may be obtained for five cents each, by addressing the "Commissioner of Patents, Washington, D. C."